(12) United States Patent
Davis et al.

(10) Patent No.: US 11,344,064 B2
(45) Date of Patent: May 31, 2022

(54) VAPORIZER CARTRIDGE DEVICES AND SYSTEMS AND METHODS OF MANUFACTURING FILLED VAPORIZER CARTRIDGES

(71) Applicant: Jacksam Corporation, Rancho Santa Margarita, CA (US)

(72) Inventors: Daniel Davis, Rancho Santa Margarita, CA (US); Dominic Melanson, Rancho Santa Margarita, CA (US); David Franklin, Rancho Santa Margarita, CA (US)

(73) Assignee: Jacksam Corporation, Costa Mesa, CA (US)

( * ) Notice: Subject to any disclaimer, the term of this patent is extended or adjusted under 35 U.S.C. 154(b) by 144 days.

(21) Appl. No.: 16/682,977

(22) Filed: Nov. 13, 2019

(65) Prior Publication Data

US 2020/0221769 A1  Jul. 16, 2020

Related U.S. Application Data

(60) Provisional application No. 62/760,039, filed on Nov. 13, 2018.

(51) Int. Cl.
| | | |
|---|---|---|
| *A24F 40/42* | (2020.01) | |
| *A24F 40/48* | (2020.01) | |
| *A24F 40/70* | (2020.01) | |
| *B23P 19/10* | (2006.01) | |
| *B23P 19/00* | (2006.01) | |
| *B23P 19/02* | (2006.01) | |
| *B23P 15/00* | (2006.01) | |

(52) U.S. Cl.
CPC .............. *A24F 40/42* (2020.01); *A24F 40/48* (2020.01); *B23P 15/00* (2013.01); *B23P 19/02* (2013.01); *B23P 19/10* (2013.01); *A24F 40/70* (2020.01)

(58) Field of Classification Search
CPC ........... B23P 19/00; B23P 19/02; B23P 19/10; A24F 40/10; A24F 40/42; A24F 40/48
See application file for complete search history.

(56) References Cited

U.S. PATENT DOCUMENTS

| | | | |
|---|---|---|---|
| 10,440,989 B2 * | 10/2019 | Gardella | B65B 3/003 |
| 2017/0035115 A1 * | 2/2017 | Monsees | A24F 40/70 |
| 2017/0121169 A1 * | 5/2017 | Dailey | B65B 43/54 |
| 2017/0231282 A1 * | 8/2017 | Bowen | A61M 11/06 |
| | | | 131/329 |

* cited by examiner

*Primary Examiner* — Bayan Salone
(74) *Attorney, Agent, or Firm* — KW Law, LLP

(57) ABSTRACT

Devices, systems and methods to facilitate partially automated production of fluid-filled vaporizer cartridges are disclosed. A device can include a vaporizer cartridge configured to be sealably assembled by a press-fit after filling. Systems and methods include systems and methods for filling an array of partially-assembled vaporizer cartridges and for assembling a array of filled, partially-assembled vaporizer cartridges simultaneously.

20 Claims, 18 Drawing Sheets

VAPORIZER CARTRIDGE DEVICES AND SYSTEMS AND METHODS OF MANUFACTURING FILLED VAPORIZER CARTRIDGES

CROSS-REFERENCE TO RELATED APPLICATIONS

This application claims the benefit of and priority to U.S. Provisional Application Ser. No. 62/760,039, entitled "VAPORIZER CARTRIDGE DEVICES AND SYSTEMS AND METHODS OF MANUFACTURING FILLED VAPORIZER CARTRIDGES," filed on Nov. 13, 2018. The entire disclosure of the aforementioned application is incorporated herein by reference for any purpose.

FIELD

The present disclosure relates to devices for vaporizing a fluid and systems and methods for assembling fluid-filled vaporizer devices. In particular, the present disclosure relates to vaporizer cartridge devices that are configured to be sealably assembled by a press-fit after filling. The present disclosure also relates to systems and methods for manufacturing filled vaporizer cartridges, in particular, systems and methods for filling and assembling multiple vaporizer cartridges simultaneously.

BACKGROUND

Electronic vaporizer devices and cartridges that contain vaporizable liquid in a "reservoir" structure frequently suffer from a variety of manufacturing, performance, and usability shortcomings. These shortcomings include challenges to filling created by the configuration of the partially-assembled and unfilled fluid reservoir, challenges to assembling filled cartridges, leaking reservoirs, and product and user safety hazards created by the potential to disassemble filled and assembled cartridges, to name several. Typical cartridge systems are not amenable to mass production or require complex and expensive equipment that may not perform consistently or with optimal throughput. Many product manufacturers fill and assemble cartridges using manual labor, leading to high production costs. Device designs that afford more robust options for filling and assembly using partial automation or mass production while also providing leak-free performance and enhanced product safety are desirable.

SUMMARY

In various embodiments, a vaporizer cartridge device can comprise a mouthpiece assembly and a reservoir assembly. The mouthpiece assembly and the reservoir assembly can be configured to be press-fit following filling of the reservoir assembly with a vaporizable fluid. A mouthpiece assembly can comprise a vapor outlet. A mouthpiece assembly can also comprise an air inlet. In various embodiments, a mouthpiece assembly can comprise a chamber housing defining a vaporization chamber and a vaporizer assembly. A vaporizer assembly can comprise a wick, a heating element, and an electrical connector. A device can comprise a spring electrode. A reservoir assembly can comprise a base support, a base electrode, and a reservoir cylinder. In various embodiments, a mouthpiece assembly and a reservoir assembly can be configured to provide an interference fit.

In various embodiments, a vaporizer cartridge device can comprise a base attachment feature configured to insertably receive a chamber housing attachment feature. The base attachment feature and the chamber housing attachment feature can comprise complementary locking ridges and locking rings configured to provide a substantially inseparable interference fit after being assembled by press-fit.

In various embodiments, a system for manufacturing fluid-filled vaporizer cartridges can comprise a cartridge tray configured to contain a reservoir assembly array, a reservoir assembly array, a mouthpiece assembly support configured to contain a mouthpiece assembly array, a mouthpiece assembly array, and a cartridge press. The mouthpiece assembly support can be configured to releaseably retain the mouthpiece assembly array to provide coordinated insertion of each of the plurality of mouthpiece assemblies in the mouthpiece assembly array into the corresponding reservoir assemblies in the reservoir assembly array to produce a partially-assembled cartridge array. The cartridge press can be configured to receive the partially-assembled cartridge array and to apply an assembly pressure to the partially-assembled cartridge array to produce an assembled cartridge array. The system can be configured to produce an assembled cartridge array from the partially-assembled cartridge array in less than about 30 seconds.

In various embodiments, a method of assembling a fluid-filled vaporizer cartridge array can comprise positioning a reservoir assembly array, dispensing a fluid into the reservoir assembly array to produce a fluid-filled reservoir assembly array, inserting a mouthpiece assembly array into the fluid-filled reservoir assembly array, aligning a mouthpiece assembly of the first partially-assembled cartridge array and pressing the aligned partially-assembled cartridge array to produce an assembled cartridge array.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The present disclosure generally relates to devices for vaporizing a fluid and systems and methods for assembling fluid-filled vaporizer devices. This disclosure of various embodiments makes reference to the accompanying drawings, which show the various embodiments by way of illustration. While these embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and by way of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1A:
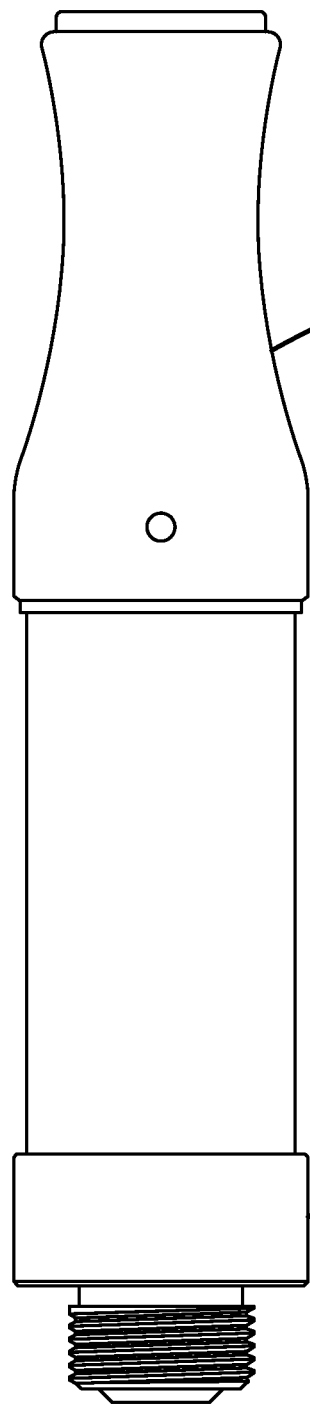
FIGS. 1A and 1B illustrate a side view and a cutaway view of a vaporizer cartridge in accordance with various embodiments of the present disclosure.
Figure 1B:
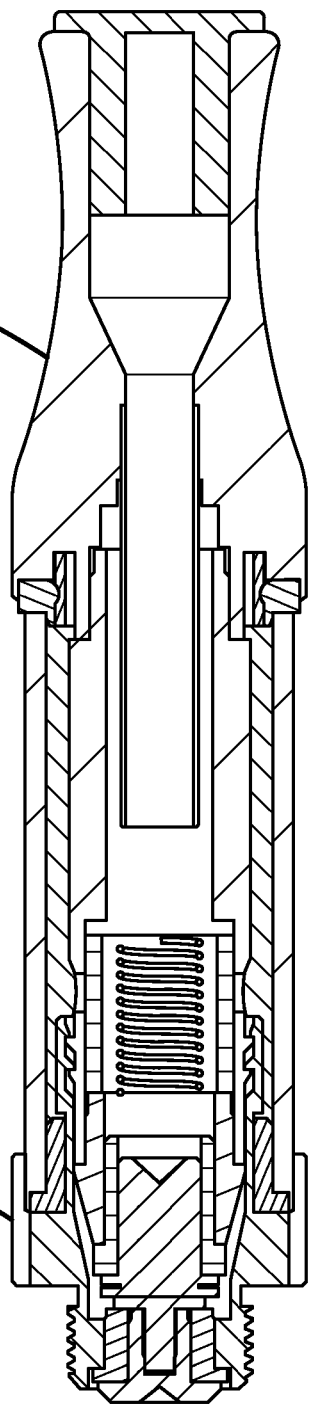

In various embodiments of the present disclosure and with reference to FIGS. 1A and 1B, a vaporizer cartridge device 100 is illustrated. A vaporizer cartridge device can comprise a plurality of components that may be assembled into various component assemblies. For example, vaporizer cartridge device 100 can comprise a mouthpiece assembly 101 and a reservoir assembly 102. As described in greater detail below, the vaporizer cartridge device component assemblies can be configured to provide for press-fit or snap-fit assembly of the mouthpiece. In various embodiments, the vaporizer cartridge device component assemblies can be assembled after filling one of the assemblies, such as a reservoir assembly, with a vaporizable liquid.

Figures 2A, 2B:
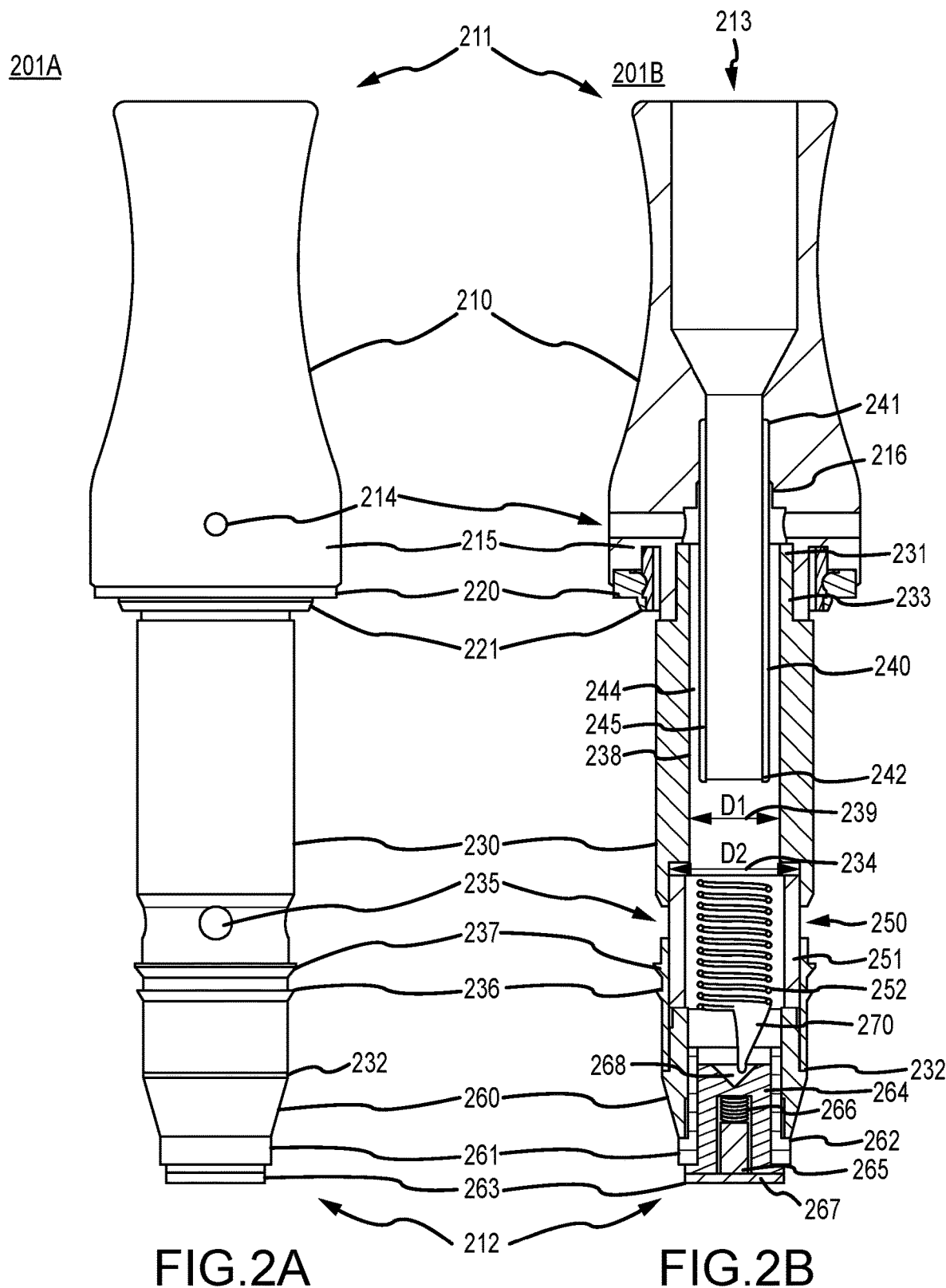
FIGS. 2A and 2B illustrate a side view and a cutaway view of a mouthpiece assembly in accordance with various embodiments of the present disclosure.

In various embodiments, a mouthpiece assembly can comprise a plurality of components assembled together. With reference now to FIGS. 2A and 2B, a mouthpiece assembly 201 is illustrated. Mouthpiece assembly 201 can comprise various mouthpiece assembly components, such as a mouthpiece, an upper reservoir gasket, a chamber housing, an inner stem, a vaporizer assembly, an electrode gasket, and an electrode. Various embodiments of a mouthpiece assembly and various components thereof are described in greater detail below.

Mouthpiece assembly 201 can comprise mouthpiece 210. Mouthpiece 210 can have a first end 211 and a second end 212. First end 211 can define a vapor outlet 213. Mouthpiece 210 can also define an air inlet 214. Air inlet 214 may be located in a lateral surface 215 of mouthpiece 210 approximately adjacent to second end 212 of mouthpiece 210. In various embodiments, mouthpiece 210 can comprise a plurality of air inlets 214, such as 2, or 3, or 4, or 5, or 6, or n air inlets 214. In some embodiments, the number of air inlets 214 may be selectable by an operator, for example, by rotation or sliding of an annular ring, panel, or similar feature configured to reversibly move between an open and a closed position with respect to at least one air inlet 214. The location of one or more air inlets 214 in a mouthpiece may provide certain functional advantaged for a fluid-filled vaporizer cartridge, such as reducing the occurrence of fluid leakage from the cartridge as compared to air inlet positions for other devices, which frequently have air inlets located near a distal end of the cartridge in closer proximity to the fluid reservoir. However, vaporizer cartridges having other configurations, including air inlets located on a component other than a mouthpiece assembly, are within the scope of the present disclosure.

A mouthpiece can be constructed of any suitable durable material such as glass, ceramic, wood, polymer, or metal. In various embodiments, mouthpiece 210 may be constructed of leaded brass. A leaded brass mouthpiece 210 may be finished with a coating, such as an acrylic-melamine coating or any suitable food grade coating material.

Air inlet 214 can be configured to provide fluid communication between an external air source (e.g., the atmosphere external to the device) and an inlet air galley 244, described in greater detail below.

Mouthpiece assembly 201 can comprise an upper reservoir gasket such as upper reservoir gasket 220. In various embodiments, an upper reservoir gasket can comprise an annular shape. An upper reservoir gasket can be configured to sealably couple with a gasket retention feature 218 machined or otherwise integrated into second end 212 of mouthpiece 210. Upper reservoir gasket 220 can be configured to receive a proximal end of a reservoir cylinder such as reservoir cylinder 470 (FIG. 4C). For example, reservoir gasket 220 comprises a chamfered segment 221 configured to slidably be received by a reservoir cylinder having an inside diameter configured to provide a clearance or interference fit with respect to the outer surface of chamfered segment 221. Upper reservoir gasket 220 can be configured to be sealably coupled with a proximal end surface 471 of reservoir cylinder 470 and/or an interior surface of reservoir cylinder 470 at a location substantially adjacent to proximal end of reservoir cylinder 470. Each of the upper reservoir gasket 220 contact with the proximal end surface of reservoir cylinder 470 and the upper reservoir gasket 220 contact with interior surface of reservoir cylinder 470 can comprise a gasket-component interface. Likewise, any contact or coupling of a gasket to another adjacent component described herein can comprise a gasket-component interface. An upper reservoir gasket or any other gasket described herein may be manufactured from a resilient, elastically deformable material such as silicon, urethane, polyacetal, polytetrafluoroethylene, nylon, or any suitable natural or synthetic polymer material.

In various embodiments, a mouthpiece assembly 201 can comprise a chamber housing 230. Chamber housing 230 may be configured as an elongated cylinder having a first end 231 and a second end 232 and defining a channel therethrough. The first end 231 may be configured to be coupled with the distal end of mouthpiece 210. In various embodiments, first end 231 of chamber housing 230 may comprise an insertion segment 233 configured to be slidably inserted into a complementary receptacle in distal end of mouthpiece 210 configured to receive insertion segment 233, thereby providing for chamber housing 230 to be coupled with mouthpiece 210 via an interference fit such as a press fit. In various embodiments, an outer surface of the proximal end of insertion segment 233 may be chamfered to facilitate sliding insertion of insertion segment 233. In various other embodiments, a chamber housing may be coupled with a mouthpiece using other coupling mechanisms, such as by a threaded coupling, a bayonet connection, or other suitable coupling mechanism. In various embodiments, chamber housing 230 is coupled to mouthpiece 210 without any need for an adhesive material. Chamber housing 230 may be reversibly coupled with mouthpiece 210.

In various embodiments, chamber housing 230 can comprise a first inner diameter d1 through a first portion of the length of chamber housing 230 and a second inner diameter d2 through a second portion of the length of chamber housing 230. For example, chamber housing 230 may comprise a smaller diameter d1 for a first portion of the length of the chamber housing located toward first end 231 and a larger diameter d2 for a second portion of the length located toward second end 232. The interior wall of chamber housing 230 at the transition from diameter d1 to d2 may be stepped up creating a ridge feature 234. Ridge feature 234 may function to maintain the position of a vaporizer assembly that may be held in the chamber housing, as described in greater detail elsewhere herein.

Chamber housing 230 can comprise one or more fluid inlets 235. Fluid inlets 235 can comprise penetrations through lateral walls of chamber housing 230, such as circular penetrations configured to provide fluid communication between a fluid reservoir located outside the outer surface of chamber housing 230 and a vaporization chamber defined within the chamber housing by an inner chamber surface and/or a vaporizer assembly. In various embodiments, chamber housing 230 can comprise a plurality of fluid inlets 235, such as 2, or 3, or 4, or 5, or 6, or n fluid inlets.

In various embodiments, chamber housing 230 can comprise a chamber housing attachment feature. A chamber housing attachment feature can be configured to enable the chamber housing to be coupled to a reservoir assembly. In various embodiments, a chamber housing attachment feature can comprise a locking ring. A locking ring can be an annular snap joint ring. A chamber housing attachment feature can comprise a plurality of annular snap joint rings. In various embodiments, chamber housing 230 can comprise a first annular snap joint ring 236 and a second annular snap joint ring 237. First and second annular snap joint rings 236 and 237 can be located distally (i.e., toward second end 232) of fluid inlets 235 along the length of chamber housing 230. In various embodiments, configuration of the chamber housing attachment feature distally of the fluid inlets may provide for the fluid inlets to be located near the bottom of the fluid reservoir when the attachment feature of the chamber housing is inserted into and coupled with the reservoir assembly, as described in greater detail elsewhere herein.

In various embodiments, first and second annular snap joint rings 236 and 237 may be configured to provide progressively more secure coupling during assembly of vaporizer cartridge 200. For example, first annular snap joint ring 236 may be configured with a first undercut y1, while second annular snap joint ring may be configured with a second undercut y2. The value of y2 may be greater than the value of y1. In various embodiments, an annular snap joint ring may be configured with a lead angle $\alpha$. First annular snap joint ring 236 may be configured with a lead angle $\alpha 1$ and second annular snap joint ring 237 may be configured with a lead angle $\alpha 2$. In various embodiments, lead angle $\alpha 1$ and lead angle $\alpha 2$ may be substantially the same, or lead angle $\alpha 1$ and lead angle $\alpha 2$ may be different. For example, lead angle $\alpha 1$ may be about 30 degrees, and lead angle $\alpha 2$ may be about 45 degrees out of parallel with the axis of the chamber housing. In various embodiments, one of a lead angle and an undercut may be configured to require a mating force W to be coupled with a corresponding annular snap ridge. In various embodiments, mating force W may be suitable to provide a desired compression C of one or more gaskets in an assembled vaporizer device. Application of desired compression C may be suitable to provide a fluid-tight seal at each of the one or more gaskets in the assembled vaporizer device.

An annular snap joint ring may also be configured with a return angle $\alpha'$. First annular snap joint ring 236 may be configured with a return angle $\alpha'1$, and second annular snap joint ring 237 may be configured with a return angle $\alpha'2$. In various embodiments, return angle $\alpha'1$ and return angle $\alpha'2$ may be substantially the same, or return angle $\alpha'1$ and return angle $\alpha'2$ may be different. In various embodiments, each of return angle $\alpha'1$ and return angle $\alpha'2$ may be about 90 degrees out of parallel with the axis of the chamber housing.

In various embodiments, a chamber housing attachment feature can be configured to be separable or substantially inseparable following insertion into and coupling with a complementary base attachment feature of a reservoir assembly, described in greater detail elsewhere herein. Attachment features configured to provide substantially inseparable coupling may be used to provide tamper-resistant assembly of fluid-filled cartridges.

In various embodiments, a mouthpiece assembly can comprise a vaporizer assembly. A chamber housing of the mouthpiece assembly may be configured to contain the vaporizer assembly. A vaporizer assembly can comprise a wick and a heating element. A heating element may be electrically connected to a mouthpiece assembly electrode via an electrical connector. For example, mouthpiece assembly 201 can comprise vaporizer assembly 250. Vaporizer assembly 250 can comprise wick 251 and heating element 252. In various embodiments, wick 251 can comprise a porous material configured to absorb a fluid. Wick 251 can comprise a porous ceramic material or any other suitable material. In various embodiments, wick 251 may be wrapped with a cellulosic material such as cotton, with the combination of materials and/or distinct component comprising a wick assembly. Heating element 252 can comprise a metal coil that may be embedded or otherwise contained within wick 251. Heating element 252 may be configured to convert electrical energy into thermal energy in a manner suitable to vaporize a fluid absorbed into wick 251. Wick 251 may be configured as a substantially cylindrical shape with an outer diameter configured to be press fit into second end 232 of chamber housing 230. For example, an outer diameter of wick 251 may be configured to provide an interference fit with respect to diameter d2 of chamber housing 230. Wick 251 may be inserted into an opening defined by a distal end of chamber housing 230 and in various embodiments may be seated against an internal feature of a chamber housing, such as ridge feature 234, that may be configured to retain the wick and/or prevent longitudinal migration of the wick toward the mouthpiece. The outer surface of wick 251 (or a wick assembly) may abut fluid inlets 235, such that a fluid placed in the fluid reservoir may make contact with the outer surface of wick 251 via fluid inlets 235 and be absorbed into wick 251 for vaporization upon application of electrical energy to heating element 252.

Wick 251 may be retained in distal end of chamber housing 230 by a chamber housing cap, such as chamber housing cap 260. Chamber housing cap 260 may be configured to partially enclose second end 232 of chamber housing 230. In various embodiments, chamber housing cap 260 can comprise a generally cylindrical shape defining an opening therethrough. A chamber housing cap can comprise an attachment section configured to be coupled to chamber housing. For example, chamber housing cap 260 comprises an insertion section configured to be insertable coupled with second end 232 of chamber housing 230 by an interference fit, with second end 232 of chamber housing 230 being configured to receive the insertion section of chamber housing cap 260. In various embodiments, an outer diameter surface of a proximal end of chamber housing cap 260 may be chamfered and/or stepped down in diameter to facilitate insertion into second end 232 of chamber housing 230. Similarly, an outer diameter surface toward the distal end of chamber housing cap 260 may be tapered or chamfered to provide a reduced diameter toward the distal end of the chamber housing cap to facilitate insertion of the distal end of the chamber housing into a base attachment feature of a reservoir assembly. The outer surface of chamber housing cap 260 can comprise a flange or step configured to seat against a distal surface of chamber housing 230. A proximal end of chamber housing cap 260 can be configured to abut a wick or wick assembly inserted into chamber housing 230 when chamber housing cap 260 is coupled with chamber housing, thereby securing the wick or wick assembly axially within chamber housing 230 between ridge feature 234 and proximal end of chamber housing cap 260.

A chamber housing cap may be configured to receive a mouthpiece assembly electrode. The mouthpiece assembly may be insulated from the chamber housing cap by an insulative gasket configured to electrically insulate a mouthpiece electrode from the chamber housing cap and chamber housing. An insulative gasket can also be configured to be elastically deformable in response to pressure on a mouthpiece assembly electrode. An insulative gasket may be manufactured from a resilient, elastically deformable material such as silicon, urethane, polyacetal, polytetrafluoroethylene, nylon, or any suitable natural or synthetic polymer material. For example, mouthpiece assembly 201 can comprise spring electrode gasket 261. Spring electrode gasket 261 can be configured to be insertably coupled with chamber housing cap 260. Spring electrode gasket 261 can be cylindrical in shape and define an opening therethrough configured to receive spring electrode 263. Spring electrode gasket 261 may be chamfered at a proximal end to facilitate insertion into chamber housing cap 260 and may have a flange 262 at a distal end, with a proximal surface of the flange configured to seat against distal end surface of chamber housing cap 260 and provide a fluid-tight seal against chamber housing cap 260 when mouthpiece assembly 201 is coupled to reservoir assembly 202.

In various embodiments, spring electrode 263 can comprise a cylindrically-shaped electrically conductive component configured to be axially-compressible. A spring electrode can comprise an outer spring electrode component 264 and an inner spring electrode component 265. An outer spring electrode component can be configured to slidably receive an inner spring electrode component in a distal end of the outer spring electrode component. A spring, such as coil spring 266, may be disposed within outer spring electrode component, between an interior wall of outer spring electrode component and an outer wall of inner spring electrode component in a configuration suitable to urge spring electrode 263 into an axially-elongated condition. Application of pressure to a contact surface 267 of inner spring electrode component may axially-compress spring electrode 263 into an axially-compressed condition. Spring electrode 263 may be configured to be electrically conductive in an axially-elongated condition and in an axially-compressed condition. In various embodiments, spring electrode 263 may be configured to provide an axial compression distance z in a range of from about 100 μm to about 10 mm. A spring electrode in accordance with various embodiments may provide an axial compression distance of about 100 μm, or about 200 μm, or about 300 μm, or about 400 μm, or about 500 μm, or about 600 μm, or about 700 μm, or about 800 μm, or about 900 μm, or about 1.00 mm, or about 1.10 mm, or about 1.20 mm, or about 1.30 mm, or about 1.40 mm, or about 1.50 mm, or about 1.60 mm, or about 1.70 mm, or about 1.80 mm, or about 1.90 mm, or about 2.00 mm, or about 2.10 mm, or about 2.20 mmm, or about 2.30 mm, or about 2.40 mm, or about 2.50 mm, or about 2.60 mm, or about 2.70 mm, or about 2.80 mm, or about 2.90 mm, or about 3.00 mm, or about 3.5 mm, or about 4.0 mm, or about 4.5 mm, or about 5.0 mm, or about 5.5 mm, or about 6.0 mm, or about 6.5 mm, or about 7.0 mm, or about 7.5 mm, or about 8.0 mm, or about 8.5 mm, or about 9.0 mm, or about 9.5 mm, or about 10.0 mm, or any incremental distance between any of the foregoing distance dimensions. Spring electrode 263 may be configured such that inner spring electrode component 265 may rotate substantially freely with respect to outer spring electrode component 264 while maintaining electrical conductivity between inner spring electrode component 265 and outer spring electrode component 264 and through spring electrode 263.

Figure 3:
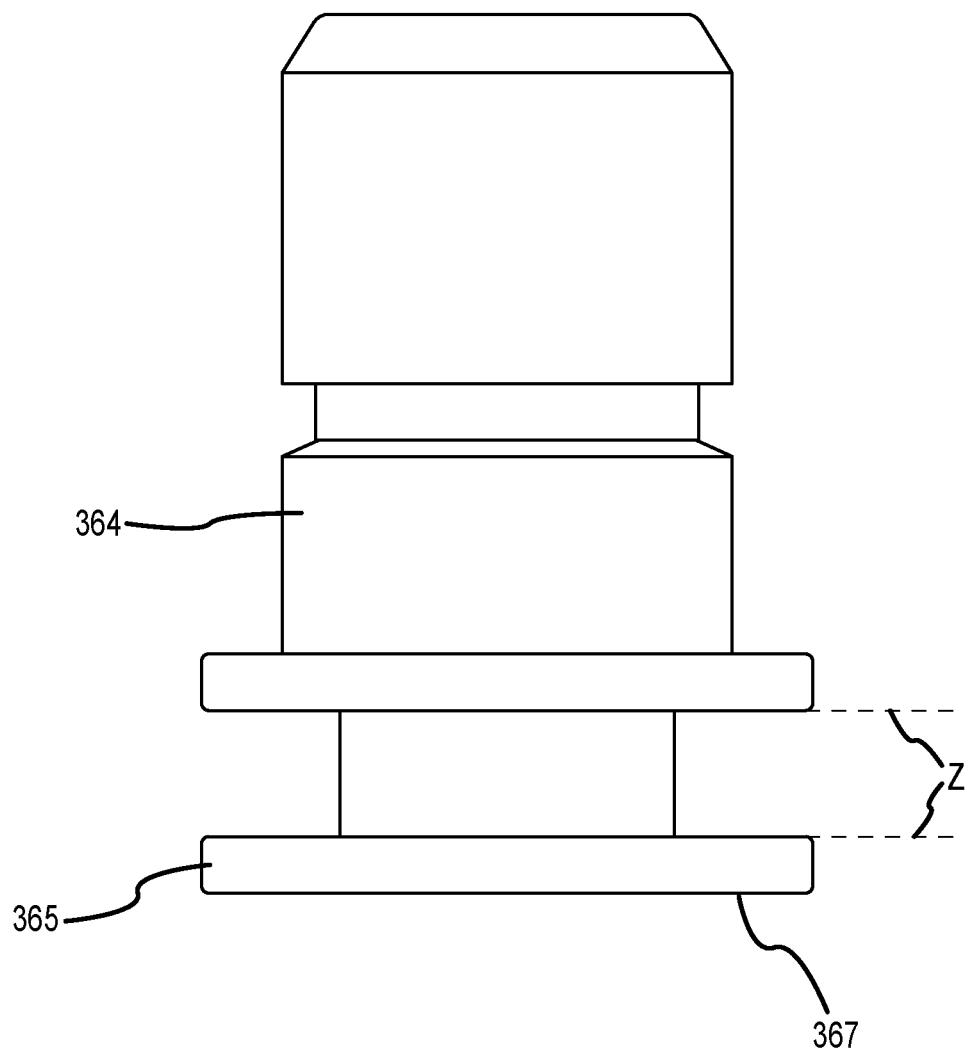
FIG. 3 illustrates a side view of a spring electrode in accordance with various embodiments of the present disclosure.

With reference briefly to FIG. 3, a spring electrode 363 in an axially-elongated condition is illustrated. In an axially-elongated condition, inner spring electrode component 365 extends from outer spring electrode component 364 by an axial compression distance of z. Application of compression force to contact surface 367 while holding outer spring electrode component 364 stationary can cause inner spring electrode component 365 to move into outer spring electrode component 364 through distance axial compression distance z, against the force of a spring housed in spring electrode 363 and configured to urge inner spring electrode component 365 axially outward from outer spring electrode component 364.

Returning now to FIG. 2B, a proximal surface 268 of outer spring electrode component may comprise a depression feature, such as a concave depression or a conical depression. The depression feature may be configured to receive a distal end of an electrical connector 270 configured to provide an electrical connection between spring electrode 263 and heating element 252. Electrical connector 270 may comprise an elastically deformable wire extending distally from heating element 252, with a proximal end of electrical connector in electrical contact with heating element 252. A distal end of electrical connector 270 may extend freely into the interior of chamber housing cap 260 prior to insertion of spring electrode gasket 261 and spring electrode 263. The distal end of electrical connector may be configured to enable the distal end to self-locate in the interior of spring electrode gasket 261 and the depression feature of proximal surface 268 of spring electrode 263 upon insertion of spring electrode gasket 261 and spring electrode 263 into chamber housing cap 260. This configuration may provide facile press-fit assembly of various mouthpiece assembly components and creation of electrical connections between heating element 252 and spring electrode 263 without requiring a soldering or other labor-intensive or failure-prone assembly step. The configuration of electrical connector may also permit rotational freedom between spring electrode 263 and the other components of the mouthpiece assembly, including heating element 252, while maintaining an electrical connection between the components.

In various embodiments, a mouthpiece assembly may also comprise an inner stem. For example, mouthpiece assembly 201 can comprise an inner stem 240. Inner stem 240 may be configured as a cylindrical tube having a first end 241 and a second end 242 and defining a vapor passage 243 therethrough. First end 241 may be insertable coupled with an inner stem receiving feature 216 of mouthpiece 210. Second end 242 may extend into vapor chamber 239, such that vapor outlet 213 of mouthpiece 210 is in fluid communication with vapor chamber 239 via vapor passage 243 of inner stem 240. Mouthpiece assembly 201 may be configured such that an inlet air galley 244 is defined by an outer surface 245 of inner stem 240 and inner surface 238 of chamber housing 230. Inlet air galley 244 may be in fluid communication with air inlet 214 and vapor chamber 239, such that as vapor is withdrawn from vapor chamber 239 due to creation of negative pressure at vapor outlet 213 by a user, air is drawn into the device from the surrounding atmosphere and into vapor chamber 239 via air inlet 214 and inlet air galley 244.

In various embodiments of the present disclosure, a vaporizer cartridge device can comprise a reservoir assembly. A reservoir assembly can comprise a plurality of reservoir assembly components, such as a base support, a base electrode, a base electrode gasket, and a lower reservoir gasket. A reservoir assembly can also comprise a reservoir cylinder. Various embodiments of a reservoir assembly and various components thereof are described in greater detail below.

Figure 4A:
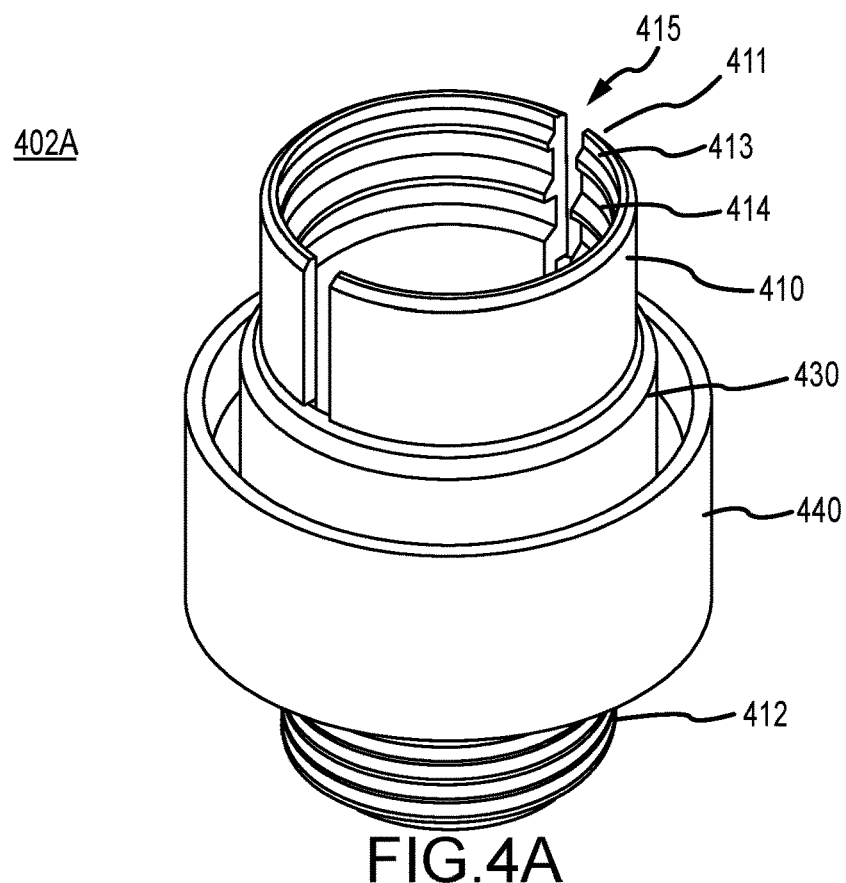
FIGS. 4A-4C illustrate perspective and cutaway views of a reservoir assembly in accordance with various embodiments of the present disclosure.
Figure 4B:
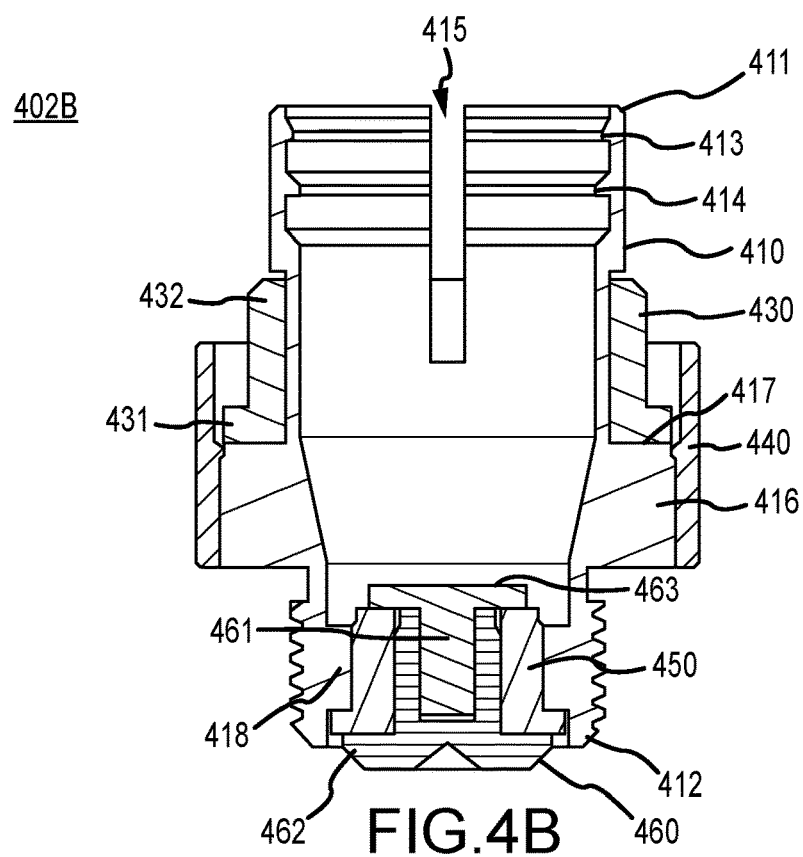
Figure 4C:
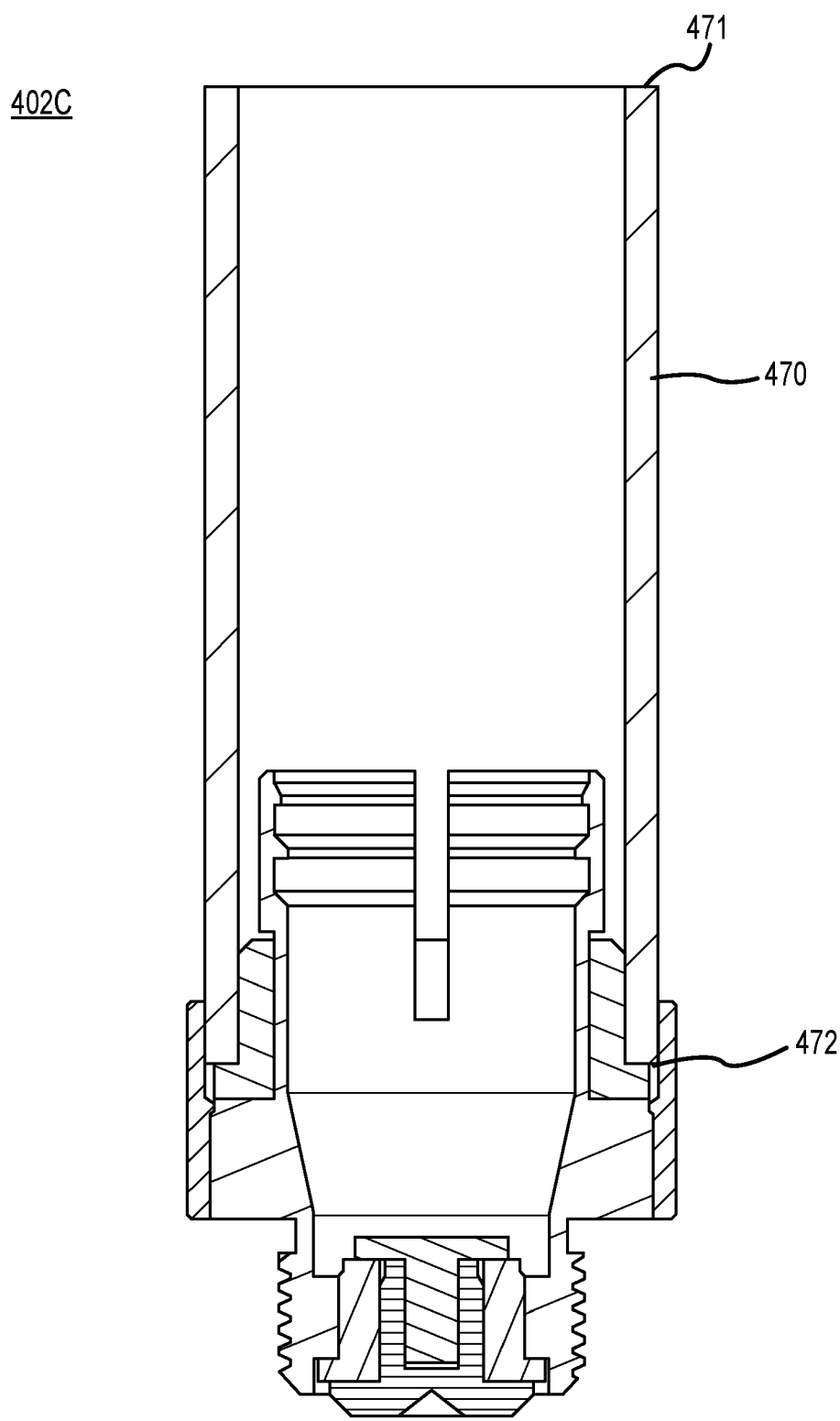

For example, and with reference now to FIGS. 4A-4C, a reservoir assembly 402A-402C is illustrated. Reservoir assembly 402 can comprise a base support 410. Base support 410 can comprise a generally cylindrical configuration defining a channel therethrough and having a first end 411 and a second end 412. First end 411 may comprise a base attachment feature configured to receive and to couple to a chamber housing attachment feature. In various embodiments, a base attachment feature can comprise a locking ridge. A locking ridge can comprise an annular snap joint ridge. An annular snap joint ridge may be continuous or discontinuous. In various embodiments, a base attachment feature can comprise a relief slot or a plurality of relief slots. A base attachment feature may be configured to be elastically deformable in response to insertion of a chamber housing attachment feature and application of a mating force. A relief slot may be configured to decrease the mating force required for insertion of a chamber housing attachment feature into the base attachment feature and coupling of a base attachment feature with a chamber housing attachment feature. For example, base support 410 comprises a first annular snap joint ridge 413 and a second annular snap joint ridge 414 located on an inner surface of base support 410 near first end 411. First annular snap joint ridge 413 and second annular snap joint ridge 414 may be configured to be complementary to and to couple with second annular snap joint ring 237 and first annular snap joint ring 236, respectively of chamber housing 230. First annular snap joint ridge 413 and second annular snap joint ridge 414 may be configured with first and second undercut dimensions, lead angles, and return angles that may be substantially similar to and/or complementary to those described elsewhere herein with respect to first and second annular snap joint rings 236 and 237 to provide progressive coupling as described.

In various embodiments, the attachment feature of base support 410 can comprise a pair of relief slots 415. Relief slots 415 may comprise slot-shaped penetrations through the walls of base support 410 and running in an axial direction from first end 411 toward second end 412 of base support 410. Relief slots 415 may be configured opposite one another and may extend through the locations of first and second annular snap joint ridges 413 and 414, such that the annular snap joint ridges are discontinuous. The lengths of relief slots may be adapted to modulate the mating force required to couple a chamber housing with the base support. The relief slot dimensions may be dependent on various factors, such as the base support materials and wall configuration in the base support attachment feature region. A base support in accordance with various embodiments of the present disclosure need not comprise a pair of relief slots, but may comprise one, two, three, four, or n relief slots in any suitable configuration.

Base support 410 can comprise a flange 416 with a proximal flange surface 417 and a distal flange surface. Proximal flange surface 417 and an exterior surface of base support 410 proximal to surface 417 may be configured to receive a lower reservoir gasket 430. An lower reservoir gasket may be manufactured from a resilient, elastically deformable material such as silicon, urethane, polyacetal, polytetrafluoroethylene, nylon, or any suitable natural or synthetic polymer material. In various embodiments, a reservoir assembly can comprise a collar configured to be coupled with an outer surface of flange by an interference fit. For example, lower reservoir assembly 402 can comprise collar 440 coupled to an outer surface of flange 416. In various embodiments, collar 440 may provide various aesthetic and/or functional advantages, such as to conceal the interface of the reservoir cylinder, reservoir cylinder gasket, and base support flange, and/or to contain an outer surface of lower reservoir gasket 430 when the device is assembled and lower reservoir gasket 430 is compressed.

Lower reservoir gasket 430 may comprise an annular configuration having an "L" shaped cross section with a base portion 431 configured to provide a fluid-tight seal between a distal surface 472 of a reservoir cylinder 470 and proximal flange surface 417 following assembly, and a riser portion 432 disposed between a portion of the exterior surface of base support 410 and an inner surface of reservoir cylinder 470. A proximal surface of lower reservoir gasket may be chamfered to facilitate assembly of reservoir cylinder 470 by insertion into distal end of reservoir cylinder 470.

Second end 412 of base support 410 can be configured to be coupled with an electrical power source. For example, second end 412 may be configured to be threadedly coupled with a power source, such as via a 510 threaded connection commonly used for coupling vaporizer cartridges with battery power sources. Second end 412 of base support 410 may be configured to provide an electrical connection with a power source. Second end 412 may define an opening configured to receive a base electrode assembly. A base electrode assembly can comprise a base electrode gasket 450 and a base electrode 460. Base electrode gasket 450 may have an annular shape configured to electrically insulate base electrode 460 from base support 410. In various embodiments, base electrode gasket 450 may provide a fluid-tight seal between base support 410 and base electrode 460. In various embodiments, base electrode 460 may comprise a single component, or base electrode 460 may comprise a plurality of assembled components. For example, as illustrated, base electrode 460 comprises a first electrode section 461 and a second electrode section 462. First electrode section 461 and second electrode section 462 may be configured to couple with one another by an interference fit, such as a press fit. Coupling first electrode section 461 and second electrode section 462 may serve to compress base electrode gasket 450 in a manner that facilitates creation of a fluid-tight seal between base electrode 460, base electrode gasket 450, and base support 410. In various embodiments, base electrode 460 need not comprise a plurality of assembled components. In an embodiment, a base electrode can comprise a unitarily constructed component having a "T" shaped cross section similar to that of first electrode section 461 but having dimensions suitable to enable insertion into second end 412 of base support 410, with the flange or arms configured to be retained by complementary interior flange 418 of base support 410, and with the riser portion configured to extend distally past distal end of second end 412 in a configuration suitable to make an electrical connection with a power source when second end 412 is coupled with the power source. A proximal surface 463 of base electrode 460 can be configured to provide an electrical connection between base electrode 460 and spring electrode 263 when reservoir assembly 402 is coupled with chamber housing 230.

Figure 5A:
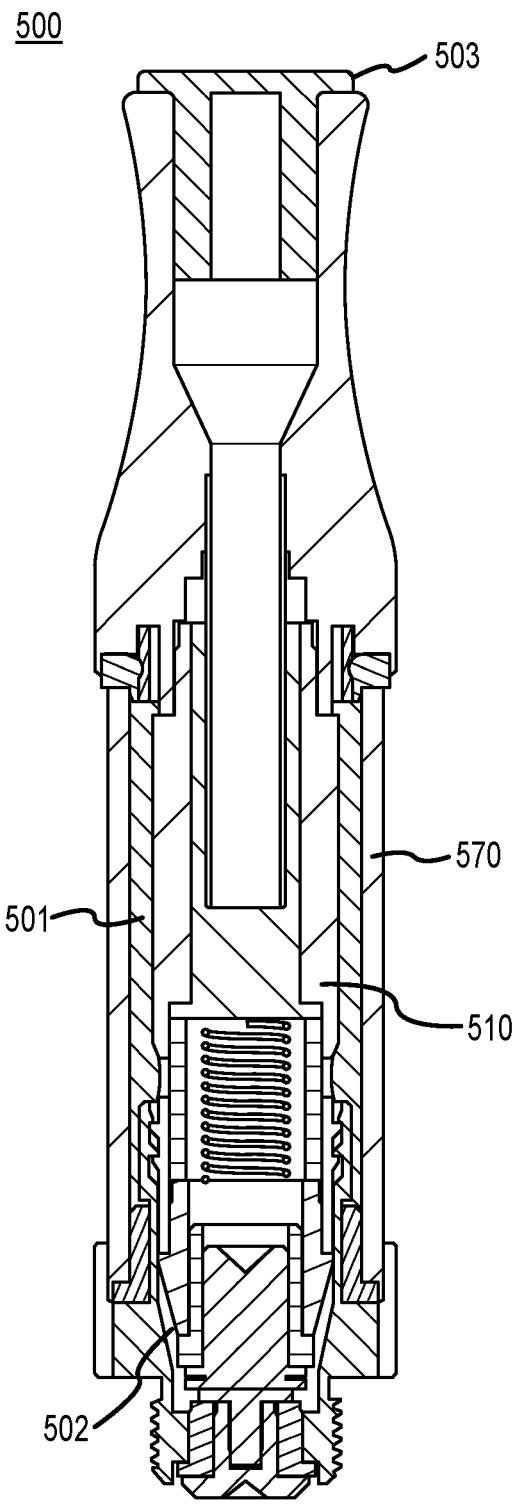
FIGS. 5A and 5B illustrate a cutaway view and a cutaway view detail of an assembled vaporizer cartridge in accordance with various embodiments of the present disclosure.
Figure 5B:
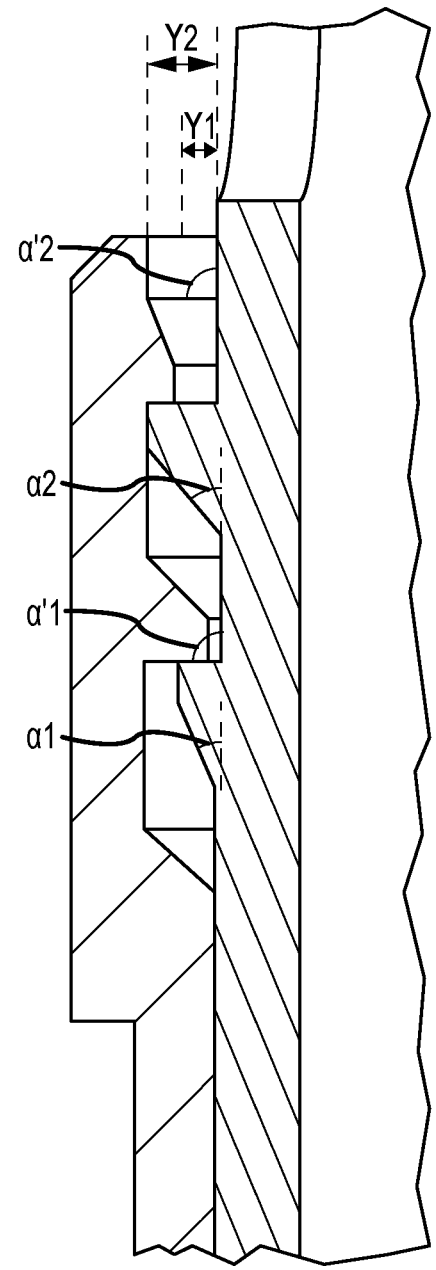

With reference now to FIG. 5A, a cross-section of an assembled vaporizer cartridge 500 is shown. Assembled vaporizer cartridge 500 comprises a fluid reservoir 501 defined between an inner surface of reservoir cylinder 570 and an outer surface of chamber housing 510. In various embodiments wherein assembled vaporizer cartridge 500 is assembled with fluid present in reservoir cylinder 570 of a reservoir assembly, residual fluid may be contained in a void space 502. In various embodiments, an assembled vaporizer cartridge 500 can comprise a mouthpiece plug 503 configured to be inserted into the vapor channel of the mouthpiece, thereby preventing contaminant entry into mouthpiece and/or providing a resilient protective component at the proximal end of the cartridge that may protect the mouthpiece finish from damage during assembly and press fitting of the mouthpiece assembly with the reservoir assembly.

Figure 6:
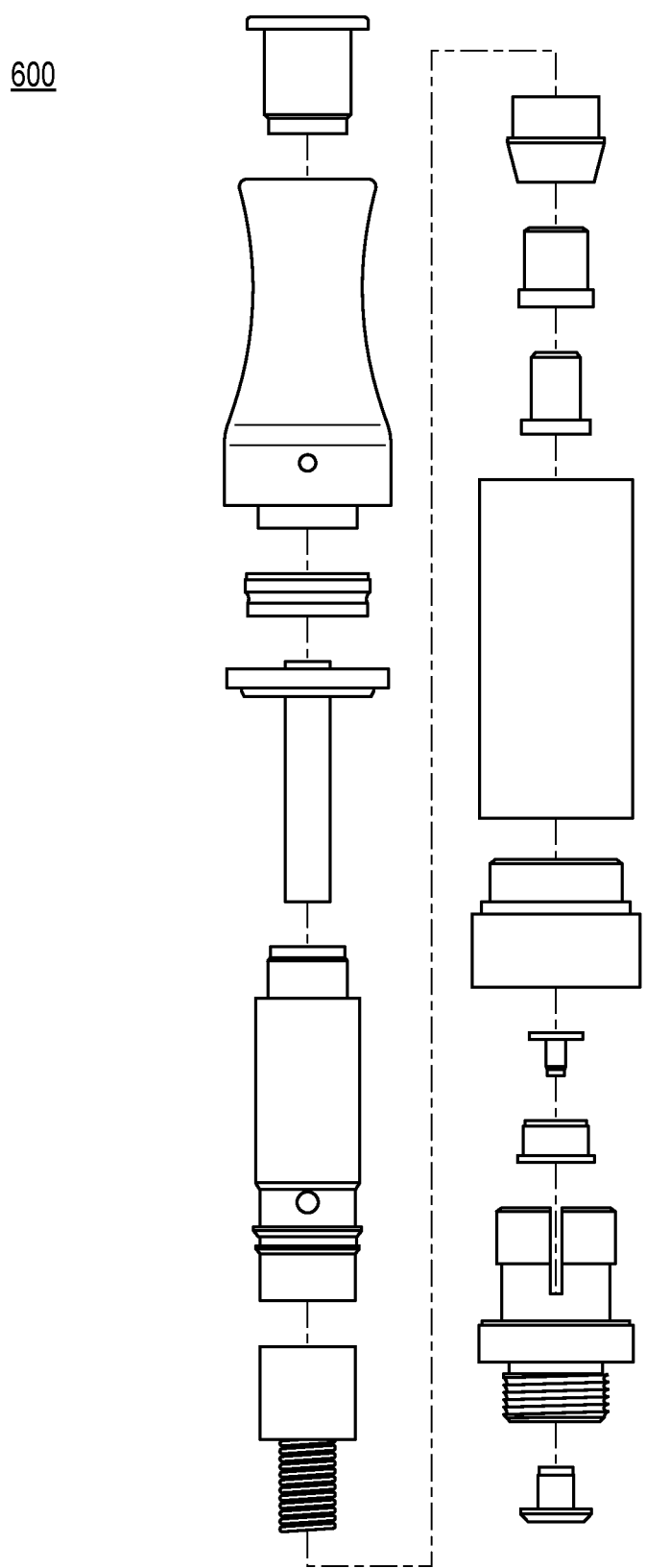
FIG. 6 illustrates an exploded view of a vaporizer cartridge in accordance with various embodiments of the present disclosure.

FIG. 6 illustrates an exploded view of the various components of a vaporizer cartridge 600 in accordance with various embodiments of the present disclosure.

In various embodiments, the vaporizer cartridge configurations disclosed herein may flexibly accommodate variations in various component sizes while reducing at least one of cartridge breakage during assembly, cartridge leakage after assembly, or electrical performance failures due to failure to establish electrical connections during manufacturing. In particular, the axial-compressibility of a spring electrode such as provided herein may provide for facile, snap-fit assembly of vaporizer cartridge components while establishing an electrical connection between various components, despite potential variation in axial dimensions of various cartridge components. Moreover, the devices provided herein may enable assembly of vaporizer cartridge components after filling a reservoir assembly with a fluid to produce a filled assembled vaporizer cartridge. Systems and methods of manufacturing a filled assembled vaporizer cartridge are provided herein and described in greater detail below.

In various embodiments of the present disclosure, a system for manufacturing filled vaporizer cartridges is provided. A system can comprise a cartridge tray, a mouthpiece assembly support, a fluid dispensing instrument, and a cartridge press. In various embodiments, a system can comprise a cartridge tray having an array of reservoir assemblies disposed in the tray and a mouthpiece assembly support having an array of mouthpiece assemblies disposed in the support in a pattern corresponding to the array of reservoir assemblies.

Figure 7:
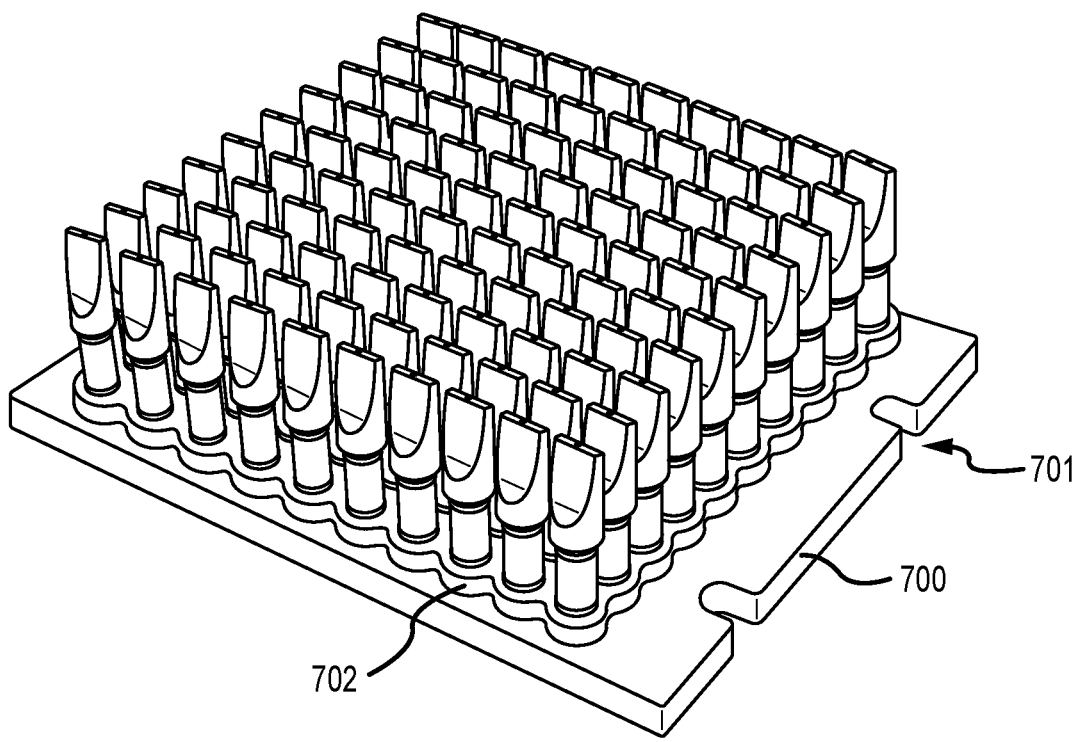
FIG. 7 illustrates a perspective view of a cartridge tray in accordance with various embodiments of the present disclosure.

A cartridge tray can be configured to receive and support an array of reservoir assemblies, each of the reservoir assemblies secured in an upright position with an opening of the fluid reservoir facing upward. For example, a cartridge tray can be configured to receive and support a 10×10 array of reservoir assemblies. A cartridge tray may be constructed of aluminum, a polymer, or any suitable substantially rigid material. The cartridge tray can comprise a block of suitable material machined with an array of wells, each well configured to receive a distal end of a reservoir assembly by a clearance fit. A cartridge tray can comprise alignment detents on one or more edges of the tray configured to receive alignment pins disposed on reservoir tray support surfaces of various instruments such as a fluid dispensing instrument or a cartridge press, with alignment of the alignment detents and the alignment pins facilitating precise location of each reservoir assembly supported by the cartridge tray so that they may be suitably aligned to be filled or capped on an automated or semi-automated basis by a fluid dispensing instrument or a cartridge press instrument. A cartridge tray 700 having alignment detents 701 and an array of wells 702 configured to receive a distal end of a reservoir assembly is illustrated in FIG. 7.

Figure 8:
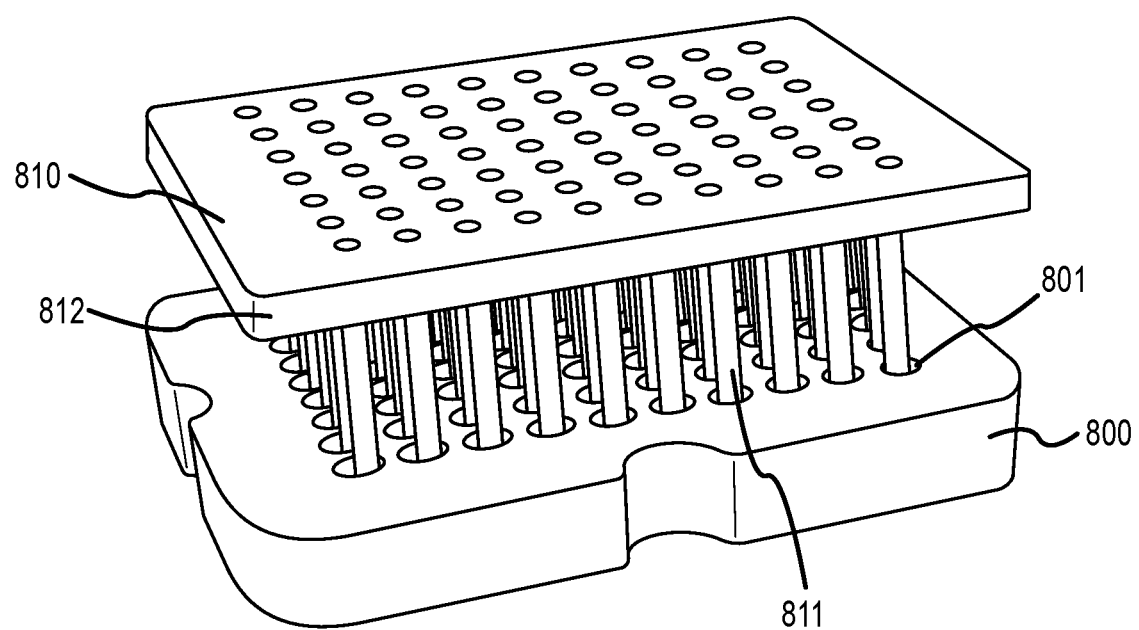
FIG. 8 illustrates a perspective view of a mouthpiece assembly support and a hand press ejector in accordance with various embodiments of the present disclosure.
Figure 9:
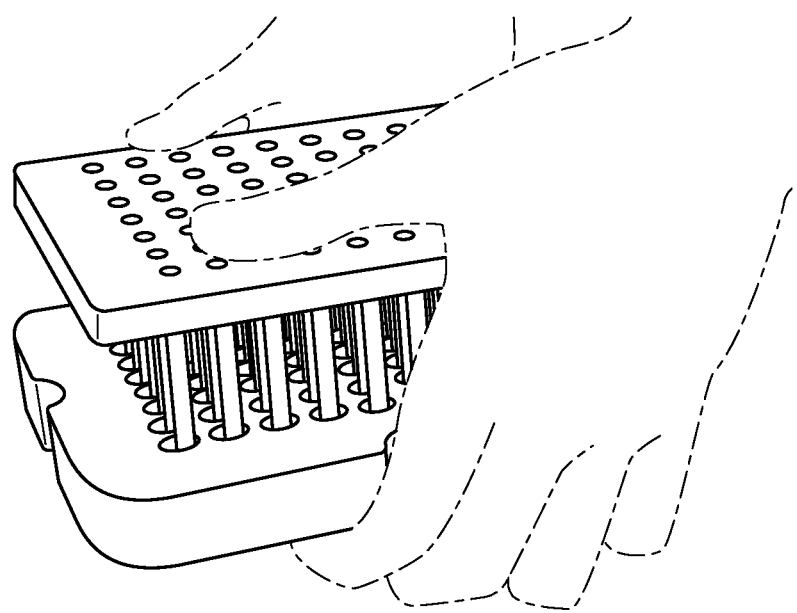
FIGS. 9 and 10 illustrate views of a mouthpiece assembly support and a hand press ejector in accordance with various embodiments of the present disclosure in use.
Figure 10:

A mouthpiece assembly support can be configured to support an array of mouthpiece assemblies, each of the mouthpiece assemblies secured in a position complementary to the position of a reservoir assembly secured in the cartridge tray. In various embodiments, a mouthpiece assembly support may be constructed of a rubber or polymer form or similar material configured to be elastically deformable and to removably retain mouthpiece assemblies by an interference fit in an array of penetrations defined by mouthpiece assembly support through. The interference fit may be suitable to resist gravitational or light mechanical pressure forces, thereby providing retention of each mouthpiece assembly in the mouthpiece assembly support during handling in an assembly or manufacturing process, including in an inverted position, while permitting each mouthpiece assembly to be pushed or withdrawn from the support manually, without necessitating the aid of a powered tool or instrument, though in various embodiments, an instrument or power tool may be used to press a mouthpiece assembly from a mouthpiece assembly support. A mouthpiece assembly support 800 having an array of penetrations 801 is illustrated in FIG. 8. In various embodiments, a system can comprise a hand tool configured to press an array of mouthpiece assemblies from a mouthpiece assembly support. A hand tool can comprise a mouthpiece assembly array ejection tool configured to permit coordinated ejection of a plurality of mouthpiece assemblies from a mouthpiece assembly support and insertion into a corresponding array of reservoir assemblies, such as hand press ejector 810 illustrated in FIG. 8. Hand press ejector 810 comprises an array of mouthpiece assembly ejector protrusions 811 assembled to a plate 812, with each protrusion 811 configured to align with and apply pressure to a mouthpiece assembly disposed in a mouthpiece assembly support, thereby permitting an operator to simultaneously eject an array of mouthpiece assemblies from a mouthpiece assembly support. FIGS. 9 and 10 illustrate a hand press ejector and a mouthpiece assembly support in use in a system and process for placing an array of mouthpiece assemblies in a corresponding array of fluid-filled reservoir assemblies disposed in a reservoir support tray.

Figure 11:
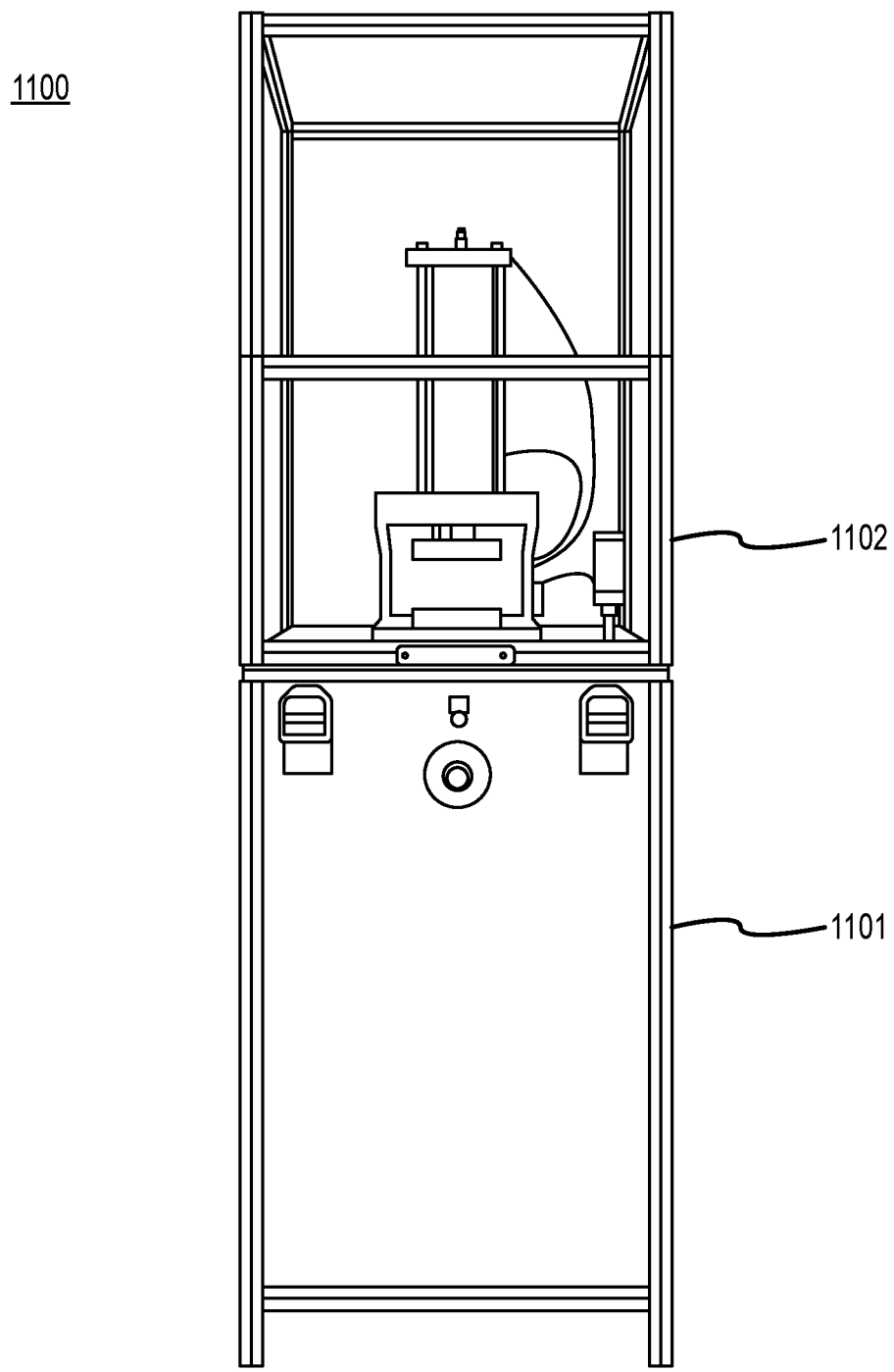
FIG. 11 illustrates a cartridge press instrument in accordance with various embodiments of the present disclosure.
Figure 12:
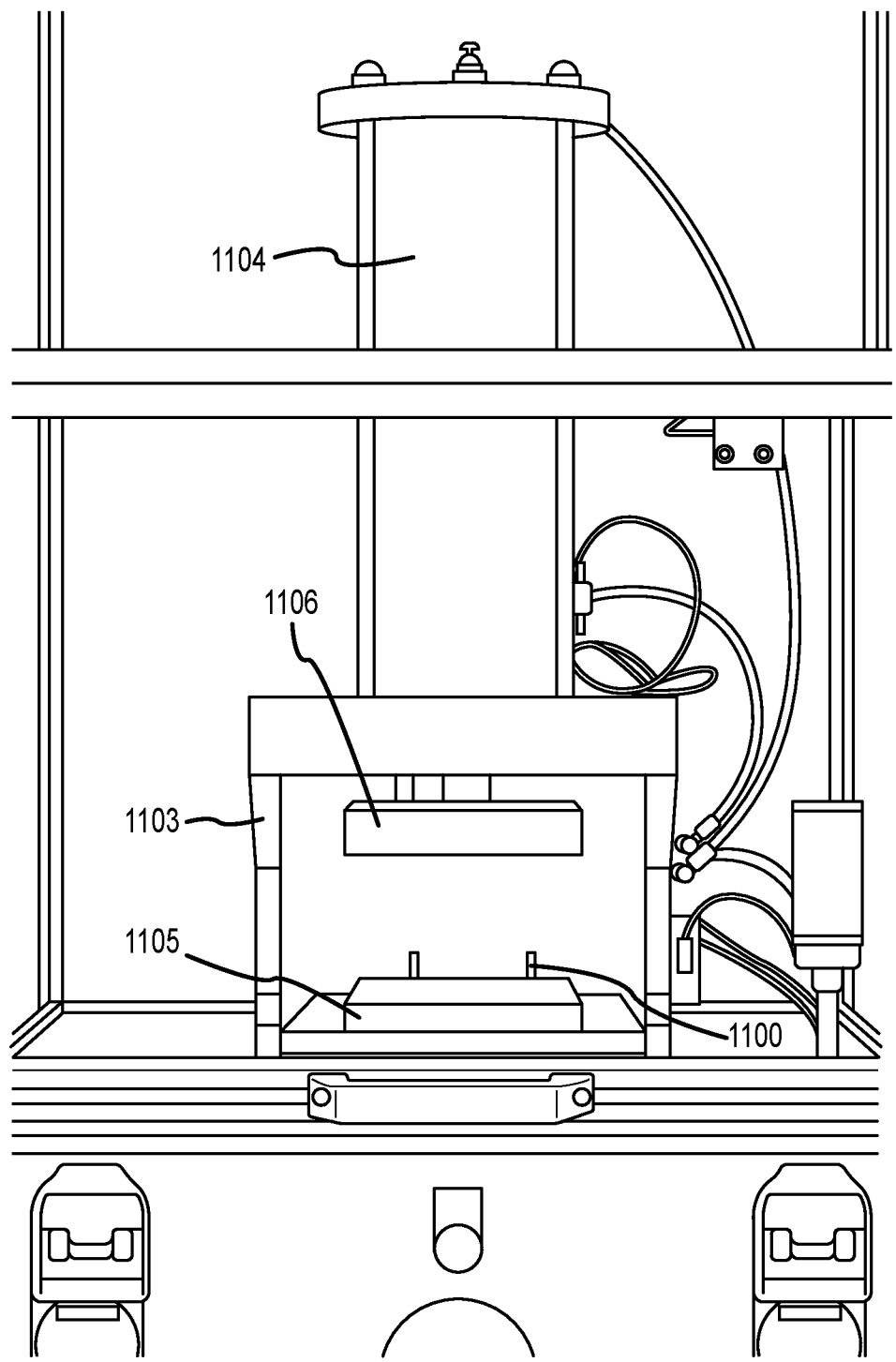
FIG. 12 illustrates a cartridge press instrument in accordance with various embodiments of the present disclosure.
Figure 13:
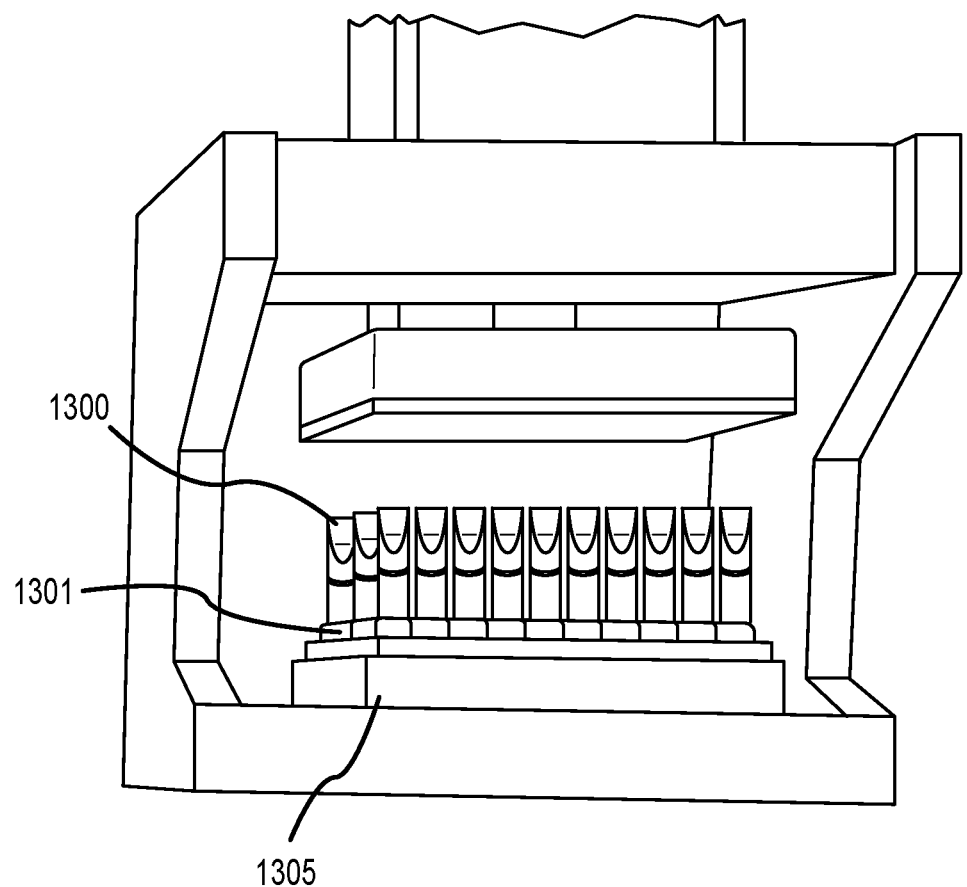
FIG. 13 illustrates a cartridge press instrument in accordance with various embodiments of the present disclosure in use.
Figure 14:
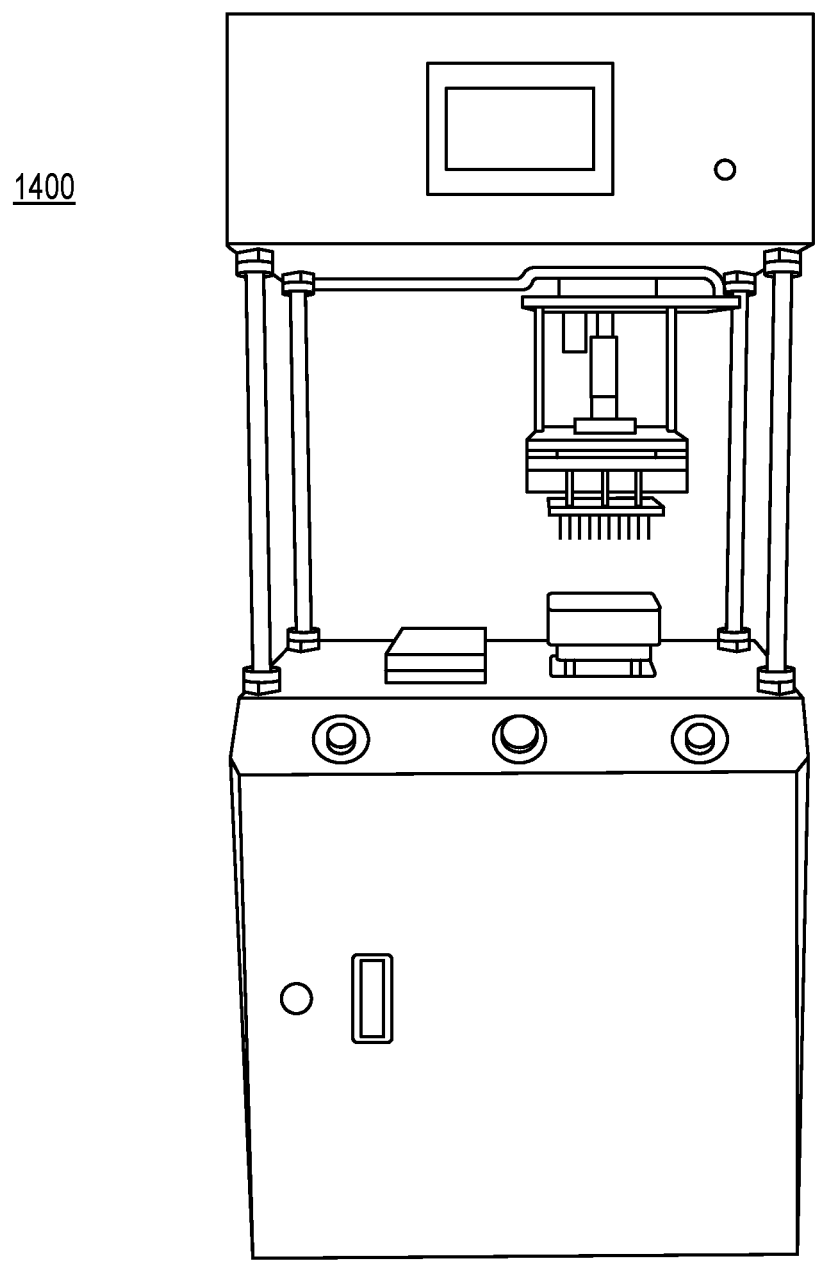
FIG. 14 illustrates a fluid dispensing instrument in accordance with various embodiments of the present disclosure.
Figure 15:
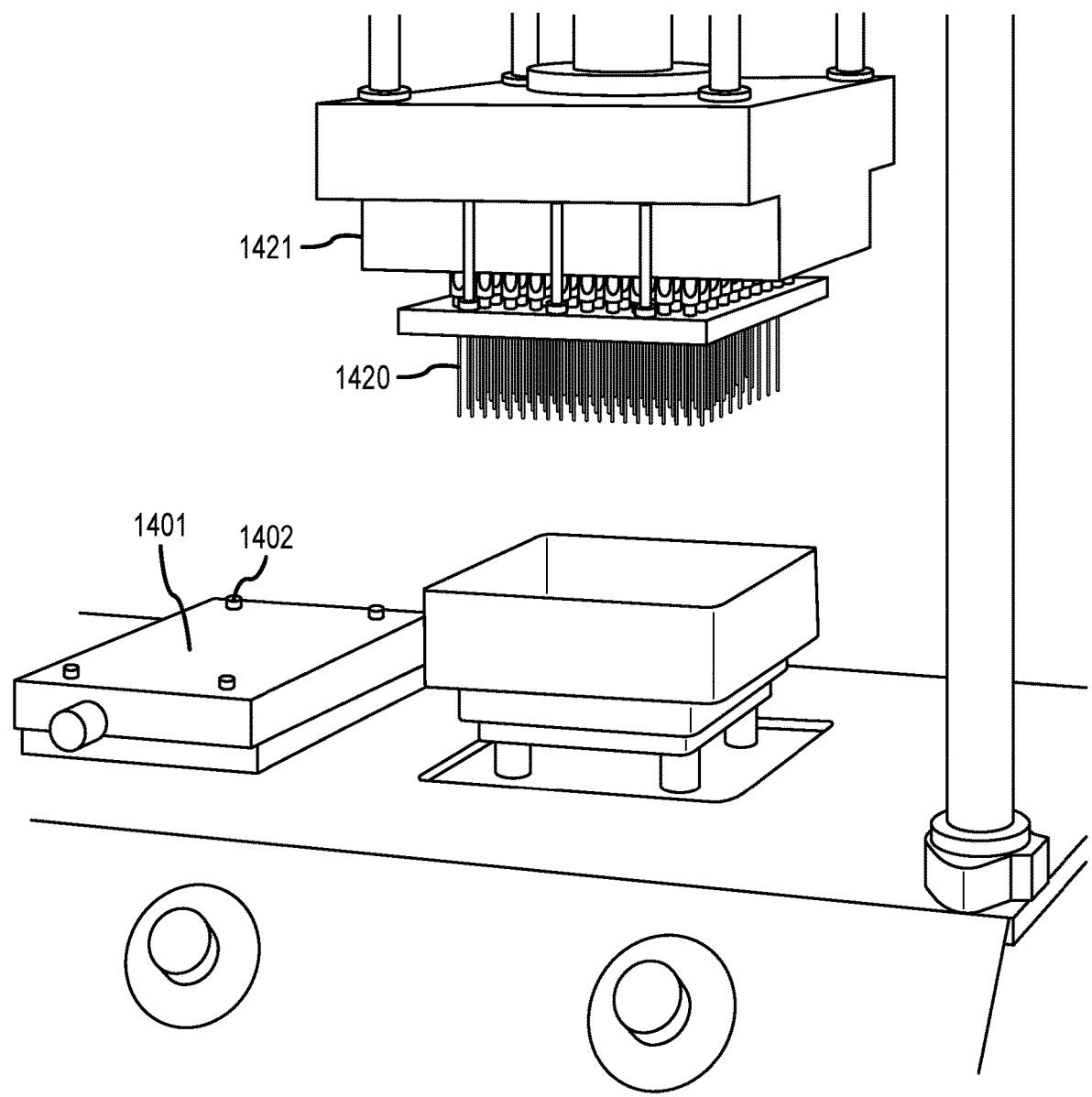
FIG. 15 illustrates a fluid dispensing instrument in accordance with various embodiments of the present disclosure.

In various embodiments, a system for manufacturing filled vaporizer cartridges can comprise a cartridge press instrument. A cartridge press instrument may be configured to apply a mating force W to each cartridge in an array of filled and partially-assembled vaporizer cartridges. FIGS. 11 and 12 illustrate views of a cartridge press instrument 1100 in accordance with various embodiments of the present disclosure. A cartridge press instrument 1100 can comprise a base 1101, a working area 1102, a press frame 1103, a press cylinder 1104, a bed 1105, and a press plate 1106. Press cylinder 1104 may be pneumatically, hydraulically, or mechanically actuated. Base 1101 can house a controller, switches, an air compressor, pump, or motor, a power supply, and the like. Bed 1105 can comprise alignment pins 1110. Bed 1105 may be configured to receive a reservoir support tray with an array of fluid-filled and partially-assembled vaporizer cartridges. Press plate 1106 may be configured to, when cartridge press instrument 1100 is actuated by an operator, contact an array of mouthpieces of partially-assembled vaporizer cartridges arranged in cartridge press instrument 1100 and to apply a force F (i.e., the assembly pressure) to an array of partially-assembled vaporizer cartridges via press plate 1106, with force F delivered by the instrument being sufficient to provide the mating force W required by each cartridge assembly in an array placed in the instrument. In various embodiments, press 1100 may be adjustably calibrated such that force F is sufficient to press-fit each partially-assembled vaporizer cartridge into a coupled condition, whereby each vaporizer cartridge is fully assembled, dependent on the mating force W required by a particular type of cartridge to be assembled. Expressed differently, vaporizer cartridge press 1100 may be configured to deliver mating force W to each partially-assembled vaporizer cartridges in an array of partially-assembled vaporizer cartridges in an automated cartridge press run, producing an array of assembled, fluid-filled vaporizer cartridges. In various embodiments, vaporizer cartridge press 1100 may be configured to produce, for example, up to about 60,000 N of force to simultaneously press fit a plurality of cartridges. FIG. 13 illustrates an array of assembled, fluid-filled vaporizer cartridges 1300 in a cartridge tray 1301 on bed 1305 of a cartridge press instrument.

Figure 19:
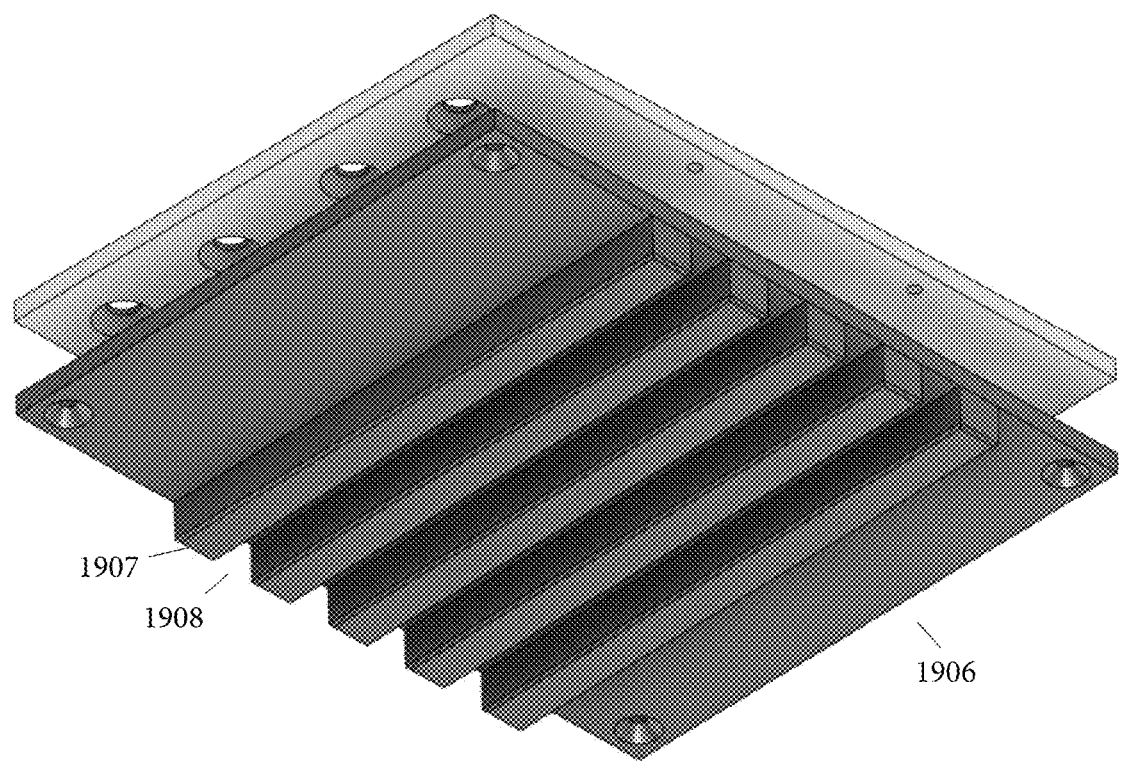
FIG. 19 illustrates a press plate in accordance with various embodiments of the present disclosure.

In various embodiments and as illustrated in FIG. 19, a press plate 1906 can be configured to comprise an array of press bars 1907 separated by slots 1908. Press plate 1906 can further be configured to provide for alignment of press bars 1907 with alternate rows of cartridge assemblies arrayed in a support tray having at least two sets of alignment detents configured to provide alternating alignment of rows of cartridge assemblies with press bars 1907 dependent on which alignment detents are aligned with alignment posts. Slots 1908 can be configured to receive rows of cartridge assemblies between those aligned with press bars 1907 so that alternate rows of cartridge assemblies are pressed in a first pressing step. The support tray can be moved to align the second set of alignment detents with alignment posts such that unpressed cartridge assemblies in the tray are aligned with press bars 1907 and pressed cartridges are aligned with slots 1908, with a second pressing step producing assembly of the remainder of the cartridges in the support tray.

In various embodiments, an automated or partially automated cartridge press run may be completed in less than about 30 second, or less than about 25 second, or less than about 20 second, or less than about 19 seconds, or less than about 18 seconds, or less than about 17 seconds, or less than about 16 seconds, or less than about 15 seconds, or less than about 14 seconds, or less than about 13 seconds, or less than about 12 seconds, or less than about 11 seconds, or less than about 10 seconds, or less than about 9 seconds, or less than about 8 seconds, or less than about 7 seconds, or less than about 6 seconds, or less than about 5 seconds. In various embodiments, an array of partially-assembled vaporizer cartridges can comprise about 100 units. In various other embodiments, an array of partially-assembled vaporizer cartridges can comprise at least about 10 units, or at least about 20 units, or at least about 30 units, or at least about 40 units, or at least about 50 units, or at least about 60 units, or at least about 70 units, or at least about 80 units, or at least about 90 units, or at least about 100 units, or at least about 121 units, or at least about 144 units, or at least about 169 units, or at least about 196 units. In various embodiments, an array of partially-assembled vaporizer units can comprise any suitable number in any suitable configuration. In various embodiments, pressing may be performed on an instrument configured with a press plate such as press plate 1906 (FIG. 19) configured to press a portion of the partially-assembled vaporizer cartridge units arrayed in the cartridge press instrument.

Figure 16:
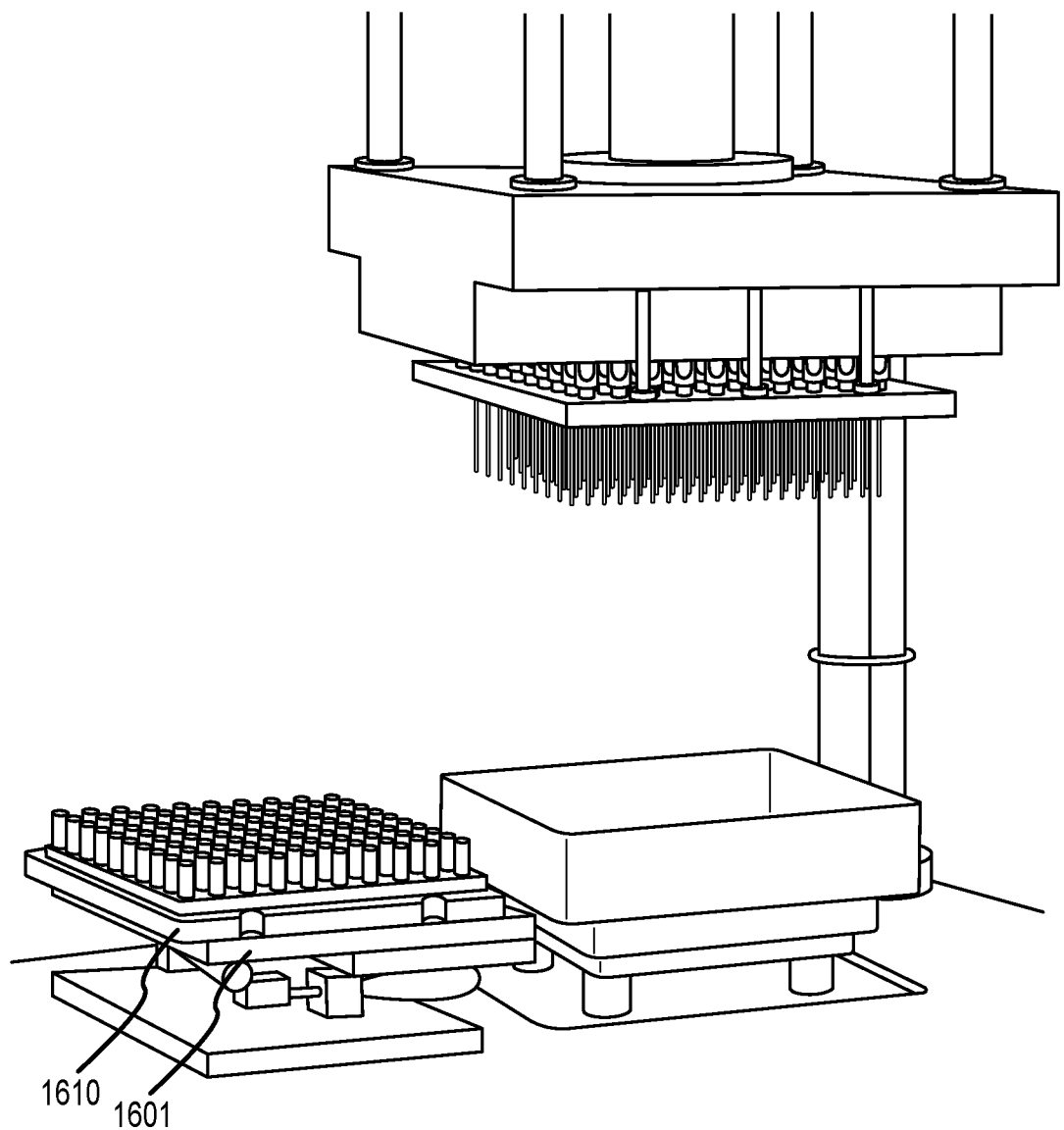
FIG. 16 illustrates a fluid dispensing instrument in accordance with various embodiments of the present disclosure in use.
Figure 17:
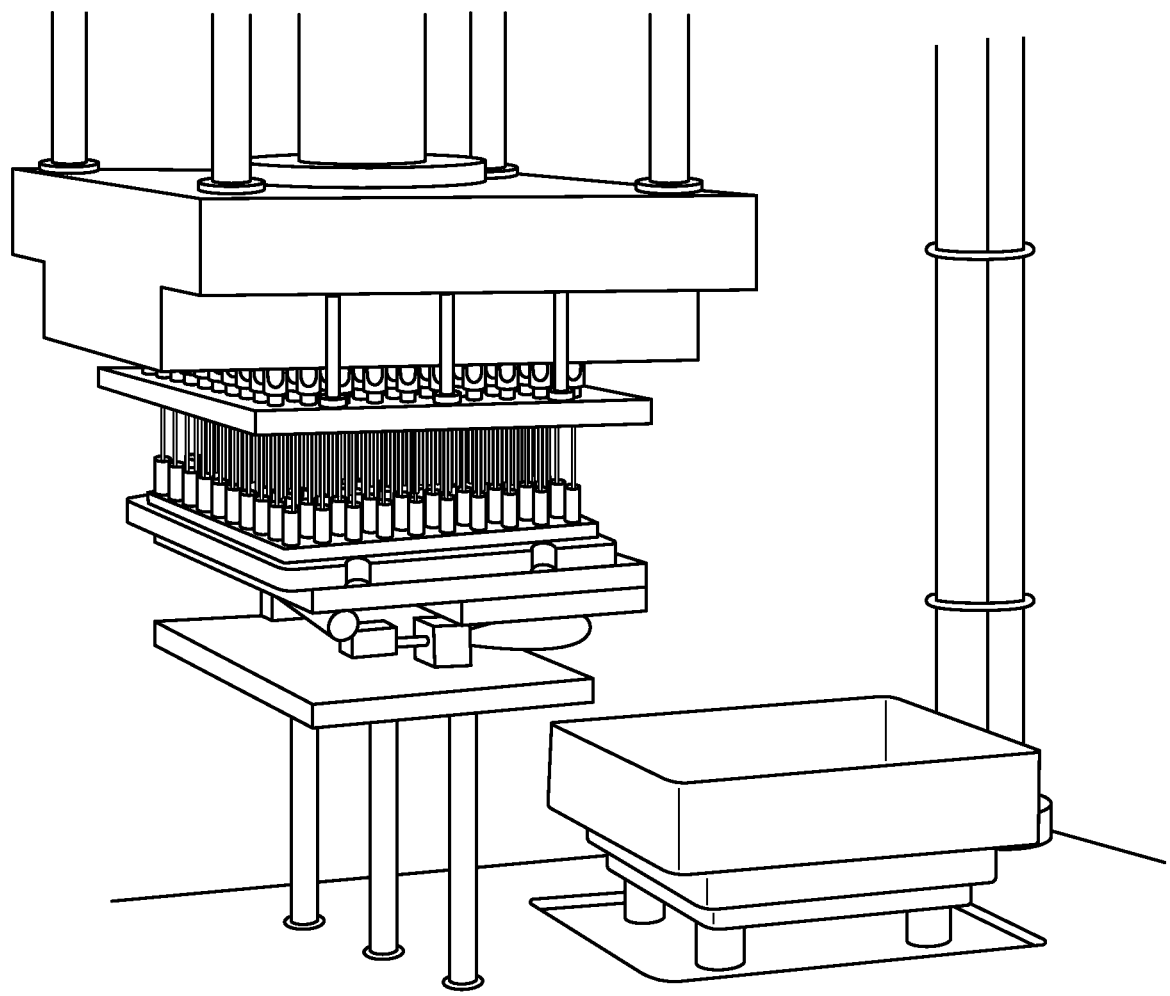
FIG. 17 illustrates a fluid dispensing instrument in accordance with various embodiments of the present disclosure in use.

In various embodiments of the present disclosure, a system for manufacturing fluid-filled, assembled vaporizer cartridges can comprise a fluid dispensing instrument. With reference now to FIGS. 14-17, a fluid dispensing instrument 1400 is illustrated. Fluid dispensing instrument 1400 can comprise a platform 1401 configured to receive a cartridge tray in accordance with various embodiments of the present disclosure. Platform 1401 can comprise alignment posts 1402 configured to be received by alignment detents of a cartridge tray. FIG. 16 illustrates a cartridge tray 1610 in place on platform 1601. Instrument 1400 can comprise a fluid dispensing needle array 1420 operably connected to a pump head 1421. Needle array 1420 may be disposed in a configuration suitable to be received within the open proximal ends of an array of reservoir assemblies disposed in a cartridge tray. Instrument 1400 can be configured to draw a predetermined volume of fluid into each needle of the fluid dispensing needle array 1420, to align each needle of needle array 1420 with a reservoir assembly in a cartridge tray, and to dispense the predetermined volume of fluid drawn into each needle into a reservoir assembly. In this manner, a system in accordance with various embodiments of the present disclosure can rapidly simultaneously fill an array of reservoir assemblies during a vaporizer cartridge manufacturing process.

Figure 18:
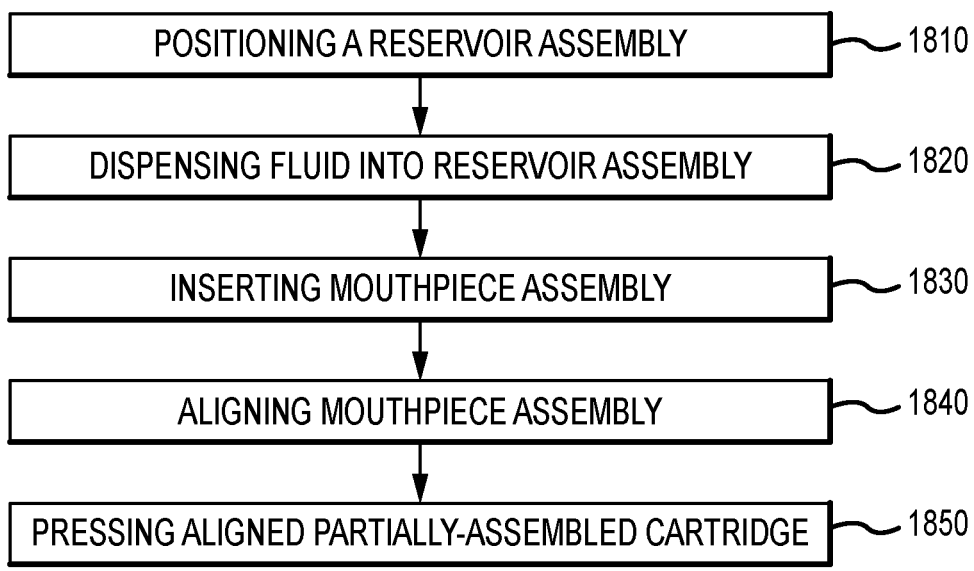
FIG. 18 illustrates a method in accordance with various embodiments of the present disclosure.

In various embodiments of the present disclosure, a method of assembling a fluid-filled vaporizer cartridge is provided. With reference to FIG. 18, a method 1800 can comprise positioning a reservoir assembly in a first position (step 1810) to produce a positioned reservoir assembly. In various embodiments, positioning a reservoir assembly in a first position 1810 can comprise placing a reservoir assembly in a cartridge tray. In various embodiments, step 1810 can comprise placing a plurality of reservoir assemblies in a tray configured to hold an array of reservoir assemblies, thereby producing an array of positioned reservoir assemblies. In various embodiments, a first position of a reservoir assembly can comprise an upright position suitable to receive fluid dispensed into the reservoir assembly.

Method 1800 can further comprise dispensing a fluid into the positioned reservoir assembly to produce a fluid-filled reservoir assembly (step 1820). In various embodiments, step 1820 may be performed using a fluid-dispensing instrument, and an array of position reservoir assemblies may be simultaneously filled to produce a plurality of fluid-filled reservoir assemblies.

A mouthpiece assembly may be inserted into the fluid-filled reservoir assembly to produce a first partially-assembled cartridge (step 1830). In various embodiments, a plurality of mouthpiece assemblies may be inserted into a plurality of fluid-filled reservoir assemblies substantially simultaneously to produce a plurality of partially-assembled cartridges. A mouthpiece assembly array ejection tool in accordance with various embodiments may be used in step 1830. Mouthpiece assemblies may be individually inserted into reservoir assemblies. In various embodiments, inserting a mouthpiece assembly into the fluid-filled reservoir assembly may produce displacement of fluid in the reservoir assembly. Fluid may be displaced from a first level to a second level in the reservoir assembly upon insertion of the mouthpiece assembly, depending on cartridge configuration; however, insertion of the mouthpiece assembly and/or assembly of the cartridge need not result in displacement of fluid within the cartridge.

Method 1800 can further comprise aligning a mouthpiece assembly chamber housing attachment feature with a reservoir assembly base attachment feature to produce an aligned partially-assembled cartridge (step 1840). In various embodiments, aligning a mouthpiece assembly chamber housing attachment feature with a reservoir assembly base attachment feature to produce an aligned partially-assembled fluid-filled cartridge can comprise pressing a first (distal) annular snap ring past a first (proximal) annular snap ridge. In various embodiments, pressing a first annular snap ring past a first annular snap ridge may be accomplished with a light mating force, such as a mating force of less than about 22 N, or less than about 18 N, or less than about 14 N, or less than about 10 N, or less than about 6 N, or less than about 5 N, or less than about 4 N, or less than about 3 N, or less than about 2 N, or less than about 1 N of force per cartridge. In various embodiments, the coupling of the first annular snap ring with the first annular snap ridge of a cartridge may be reversible.

Method 1800 can further comprise pressing the aligned partially-assembled fluid-filled cartridge to produce an assembled fluid-filled cartridge (step 1850). In various embodiments, pressing step 1850 can comprise pressing the first (distal) annular snap ring past a second (distal) annular snap ridge and a second (proximal) annular snap ring past the first (proximal) annular snap ridge, thereby coupling the respective pairs of annular snap rings and annular snap ridges (the second or assembly coupling step).

In various embodiments, the pressing action performed in step 1840 may be separate and distinct from the pressing action performed in step 1850, separated, for example, by a pause in the movement of a press plate and/or a retraction of a press plate from the partially-assembled fluid-filled cartridge. Method 1800 can comprise simultaneously performing steps 1840 and/or 1850 for a plurality of cartridge assemblies arrayed in a tray. In various embodiments of a method performed using a press plate such as press plate 1906, pressing steps 1840 and/or 1850 may be repeated two or more times to press and fully assemble portions of an array of cartridge assemblies, with the tray holding the array of cartridge assemblies realigned with guide posts between repeated pressing steps.

In various embodiments of a method of assembling a fluid-filled vaporizer cartridge, cartridge components having a variety of configurations may be used and need not comprise annular snap rings or the various other features of the particular vaporizer cartridges described in detail herein. Other vaporizer cartridge component configurations and interference fit features suitable to provide cartridge assembly by an interference fit that can be achieved by axial compression of cartridge components, including a fluid-filled cartridge component, are within the scope of the present disclosure. For example, cartridge components may be configured to provide a press fit or friction fit, such as by other snap-fit configurations, or by coupling of an oversized shaft with an undersized bore, which components may be tapered or chamfered to facilitate seating or progressive fit. Such other cartridge component configurations and interference fit mechanisms may be compatible with the methods of assembling a fluid-filled vaporizer cartridge as described herein, with a first partial press in step 1840 producing an aligned (or seated) partially-assembled fluid-filled cartridge, and a second press step 1850 producing a fully assembled fluid-filled cartridge. In various embodiments, steps 1840 and 1850 need not be separate and distinct, and partially-assembled cartridge assemblies may be press fit into a fully assembled condition in a single press step.

In various embodiments, the assembly coupling step may produce a substantially inseparable coupling between the chamber housing attachment feature and the reservoir assembly base attachment feature. The assembly coupling step may require a mating force of at least about 89 N, or at least about 133 N, or at least about 178 N, or at least about 222 N, or at least about 267 N, or at least about 311 N, or at least about 356 N, or at least about 400 N, or at least about 445 N, or at least about 500 N, or at least about 550 N, or at least about 600 N of force per cartridge. In various embodiments, the assembly step requires about 356 N of force per cartridge. In various embodiments, pressing an aligned partially-assembled cartridge to produce an assembled cartridge can produce an electrical contact between a base electrode and a spring electrode, thereby producing an electrically-conductive assembled cartridge. An aligned partially-assembled cartridge may not be electrically-conductive prior to completion of the pressing step. In various embodiments, pressing an aligned partially-assembled cartridge may produce a fluid-tight seal between two cartridge components. Pressing an aligned partially-assembled cartridge may produce a plurality of fluid-tight seals. For example, pressing an aligned partially-assembled cartridge may produce a fluid-tight seal at one of an upper reservoir gasket contact with a reservoir cylinder and a lower reservoir gasket contact with a reservoir cylinder. In various embodiments, pressing an aligned partially-assembled cartridge may produce a fluid-tight seal at a plurality of gasket-component interfaces. In various embodiments, pressing an aligned partially-assembled cartridge may produce a fluid-tight seal at a gasket-component interface for a plurality of gaskets, each of the plurality of gaskets having a gasket-component interface. In accordance with various embodiments, any of the steps of method 1800 can be performed using a plurality of vaporizer cartridge components in connection with the various system components and features described elsewhere herein. In various embodiments, a method of assembling a fluid-filled vaporizer cartridge can be performed without requiring that any threaded connections be made between components or component assemblies.

Devices, systems, and methods are provided in the present disclosure. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system comprising:
   a cartridge tray configured to contain a reservoir assembly array;
   a reservoir assembly array comprising a plurality of reservoir assemblies disposed in the cartridge tray;
   a mouthpiece assembly support;
   a mouthpiece assembly array comprising a plurality of mouthpiece assemblies disposed in the mouthpiece assembly support, the mouthpiece assemblies configured to snap-fit to the plurality of reservoir assemblies; and
   a cartridge press;
   wherein the mouthpiece assembly support is configured to releasably retain the mouthpiece assembly array in an inverted position and align the mouthpiece assemblies with the reservoir assemblies, wherein the mouthpiece assemblies insert into the reservoir assemblies to produce a partially assembled cartridge array comprising a plurality of partially assembled cartridges;
   wherein the cartridge press receives the partially assembled cartridge array and applies an assembly pressure to the partially assembled cartridge array; and
   wherein each partially assembled cartridge in the plurality the partially assembled cartridges is assembled in response to the assembly pressure.

2. The system of claim 1, further comprising an ejection tool that coordinates ejection of the mouthpiece assemblies from the mouthpiece assembly support.

3. The system of claim 1, wherein the system produces an array of assembled cartridges from an array of partially assembled cartridges in less than 30 seconds.

4. The system of claim 1, wherein the cartridge tray comprises alignment detents and an array of wells to receive distal ends of the reservoir assemblies.

5. The system of claim 1, wherein the mouthpiece assembly support comprises an elastically deformable material.

6. The system of claim 5, wherein the mouthpiece assembly support removably retains the mouthpiece assemblies by an interference fit in an array of penetrations defined through the mouthpiece assembly support.

7. The system of claim 1, wherein the cartridge press simultaneously delivers a mating force to each partially assembled cartridge from the plurality of partially assembled cartridges.

8. The system of claim 7, wherein the partially assembled cartridge array comprises at least 100 units.

9. The system of claim 7, wherein the partially assembled cartridge array comprises at least 50 units.

10. The system of claim 7, wherein the cartridge press comprises a press plate that contacts the partially assembled cartridge array to deliver the mating force.

11. The system of claim 7, wherein the cartridge press delivers the mating force of at least 89 N to each partially assembled cartridge in the cartridge array.

12. The system of claim 7, wherein the cartridge press delivers the mating force of at least 600 N to each partially assembled cartridge in the cartridge array.

13. The system of claim 1, further comprising a needle array insertable into the reservoir assemblies disposed in the cartridge tray, wherein the needle array dispenses a predetermined volume of fluid into each reservoir assembly from the plurality of reservoir assemblies.

14. A system comprising:
    a cartridge tray;
    a reservoir assembly array comprising at least 10 reservoir assemblies, the reservoir assembly array disposed in the cartridge tray;
    a mouthpiece assembly support;
    a mouthpiece assembly array comprising at least 10 mouthpiece assemblies, the mouthpiece assembly array disposed in the mouthpiece assembly support with the at least 10 mouthpiece assemblies configured to snap-fit to the at least 10 reservoir assemblies;

a needle array comprising at least 10 needles insertable into the at least 10 reservoir assemblies, wherein each needle in the needle array dispenses a predetermined volume of fluid into the at least 10 reservoir assemblies in the reservoir assembly array; and a cartridge press, wherein the mouthpiece assembly support is removably coupled to the mouthpiece assembly array to align the mouthpiece assemblies with the reservoir assemblies, wherein the-mouthpiece assemblies insert into the reservoir assemblies forming a partially assembled cartridge array, the partially assembled cartridge array comprising at least 10 partially assembled cartridges, wherein the cartridge press receives the partially assembled cartridge array and applies an assembly pressure to the partially assembled cartridge array, and wherein each partially assembled cartridge in the plurality the partially assembled cartridges is assembled in response to the assembly pressure applied by the cartridge press.

15. The system of claim 14, wherein the needle array simultaneously dispenses the predetermined volume of fluid into the at least 50 reservoir assemblies.

16. The system of claim 14, wherein the cartridge tray comprises alignment detents and an array of wells to receive distal ends of the at least 50 reservoir assemblies.

17. The system of claim 14, wherein the mouthpiece assembly support comprises an elastically deformable material.

18. The system of claim 17, wherein the mouthpiece assembly support removably retains the at least 50 mouthpiece assemblies by an interference fit in an array of penetrations defined through the mouthpiece assembly support.

19. A system for assembling vaporizer cartridges, comprising:

a cartridge tray containing a plurality of reservoir assemblies;

a mouthpiece assembly support containing a plurality of mouthpiece assemblies, wherein the mouthpiece assemblies are configured to snap-fit to the reservoir assemblies;

a needle array insertable into the reservoir assemblies to fill the reservoir assemblies with a predetermined volume of fluid; and a cartridge press configured to apply an assembly pressure to a plurality of partially assembled cartridges sufficient to form assembled cartridges in response to a mating force being applied to each partially assembled cartridge, the partially assembled cartridges comprising the filled reservoir assemblies aligned with the mouthpiece assemblies.

20. The system of claim 19, wherein the cartridge press is configured to simultaneously apply the mating force to each partially assembled cartridge.

* * * * *